(12) United States Patent
Nigrin et al.

(10) Patent No.: US 7,046,653 B2
(45) Date of Patent: May 16, 2006

(54) DIVERSITY COMMUNICATION SYSTEM AND METHOD OF OPERATION THEREOF

(76) Inventors: Jan Nigrin, 87 Brander Drive, Edmonton, Alberta (CA) T6H 4X5; Martin Polasek, 3919 150 Street, Edmonton, Alberta (CA) T6R 1J5

( * ) Notice: Subject to any disclaimer, the term of this patent is extended or adjusted under 35 U.S.C. 154(b) by 687 days.

(21) Appl. No.: 10/051,360

(22) Filed: Jan. 22, 2002

(65) Prior Publication Data

US 2002/0141520 A1  Oct. 3, 2002

Related U.S. Application Data

(63) Continuation of application No. 09/610,629, filed on Jul. 5, 2000, now abandoned, which is a continuation of application No. 09/071,301, filed on May 1, 1998, now abandoned.

(51) Int. Cl.
*H04J 1/00* (2006.01)

(52) U.S. Cl. ........................................ 370/343; 375/267

(58) Field of Classification Search ................ 370/335, 370/342, 537, 347, 216, 225, 343; 375/349, 375/351, 267, 299, 347
See application file for complete search history.

(56) References Cited

U.S. PATENT DOCUMENTS 4,384,358 A * 5/1983 Shiki et al. ................. 375/347
5,203,023 A * 4/1993 Saito et al. ................. 455/133
5,291,579 A * 3/1994 Marino ....................... 392/406
5,325,403 A * 6/1994 Siwiak et al. ............... 375/347

(Continued)

OTHER PUBLICATIONS

J. Nigrin and M. Polasek, "Digital Radio—Nature of Impairments, Diversity of Signal Characteristics and Effective Designs," CRC Contract: 67 CRC-5-2167, Apr. 11, 1996.*

(Continued)

*Primary Examiner*—Melvin Marcelo
(74) *Attorney, Agent, or Firm*—Terry M. Gernstein

(57) ABSTRACT

The invention is a diversity radio reception system and process of operation. At least two diversity radio signals are received each containing a sequence of corresponding data units which are each subject to an intermittent error from one to Y data units in duration wherein Y is an integer equal to at least one. Corresponding data units of the sequence of data units of the at least two diversity radio signals are compared to identify at least one corresponding data unit in the at least two diversity radio signals which differs. When no difference in at least one corresponding data unit is identified, one of the at least two sequences of corresponding data units are outputted. When at least one difference in at least one data unit of the sequence of corresponding data units is identified, each data unit within the at least one difference of the sequence of corresponding data units is processed to output each data unit within each difference having a higher probability of not containing an error.

50 Claims, 10 Drawing Sheets

U.S. PATENT DOCUMENTS

| | | | |
|---|---|---|---|
| 5,351,274 A * | 9/1994 | Chennakeshu et al. | 375/347 |
| 5,379,324 A * | 1/1995 | Mueller et al. | 375/340 |
| 5,402,451 A * | 3/1995 | Kaewell et al. | 375/347 |
| 5,446,759 A * | 8/1995 | Campana, Jr. | 375/267 |
| 5,465,271 A * | 11/1995 | Hladik et al. | 375/267 |
| 5,487,091 A * | 1/1996 | Jasper et al. | 375/347 |
| 5,515,380 A * | 5/1996 | Giger | 714/701 |
| 5,541,963 A * | 7/1996 | Nakagoshi | 375/347 |
| 5,559,838 A * | 9/1996 | Nakagoshi | 375/347 |
| 5,566,364 A * | 10/1996 | Mizoguchi et al. | 455/132 |

OTHER PUBLICATIONS

J. Nigrin, M. Polasek and J.M. Nigrin, "Digital Radio—Outage/Fade Characteristics and Applicability of Current Prediction Techniques," CRC Contract: CRC-CR-94-002, Jun. 14, 1994.*

J. Nigrin and M. Polasek, Digital Radio—Polarization Diversity and Related Topics (1994-1995).*

* cited by examiner

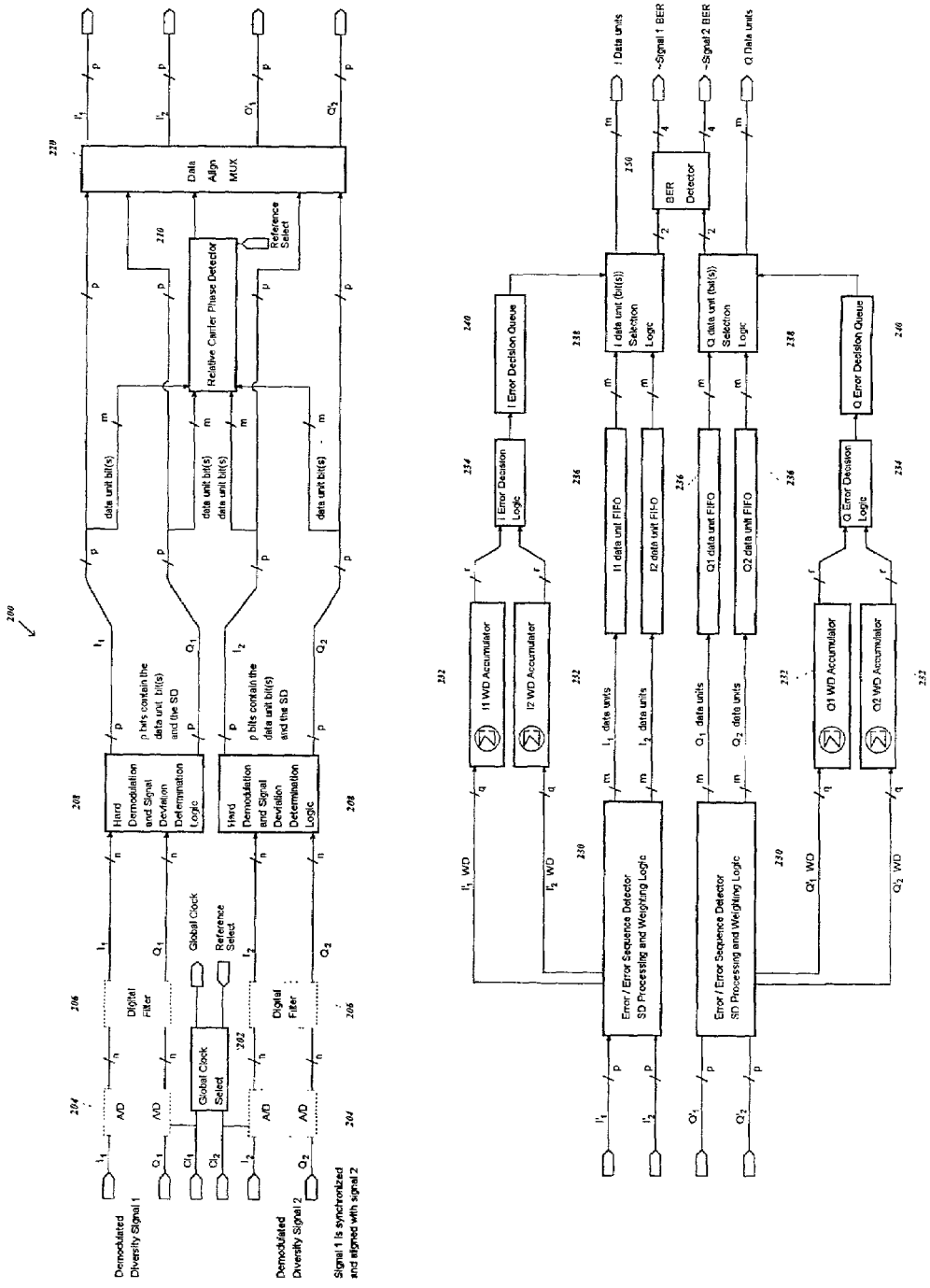
Fig. 6 Block Diagram of the Diversity Signal Data Selector System

Fig. 7 Global Clock Select
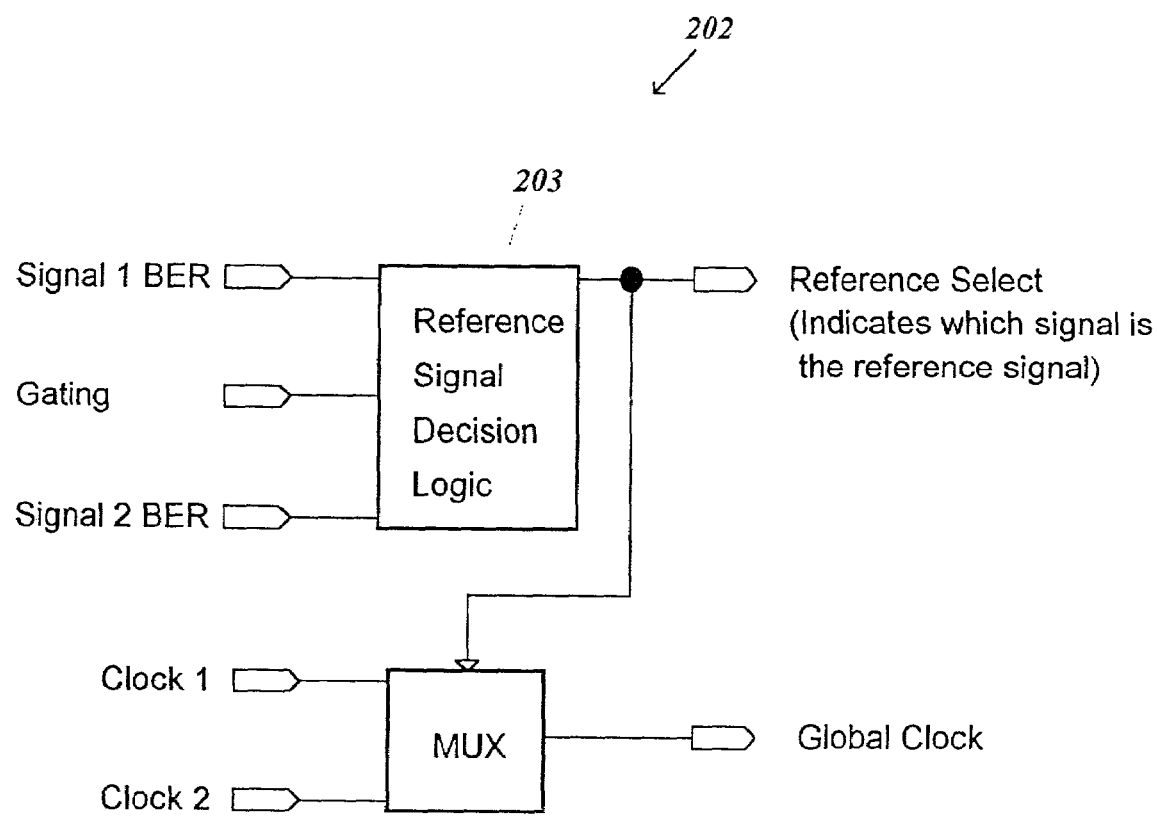

Fig. 8 Simplified Diagram of Data Alignment Circuit (QPSK or QPRS modems)
Relative Carrier Phase Detector
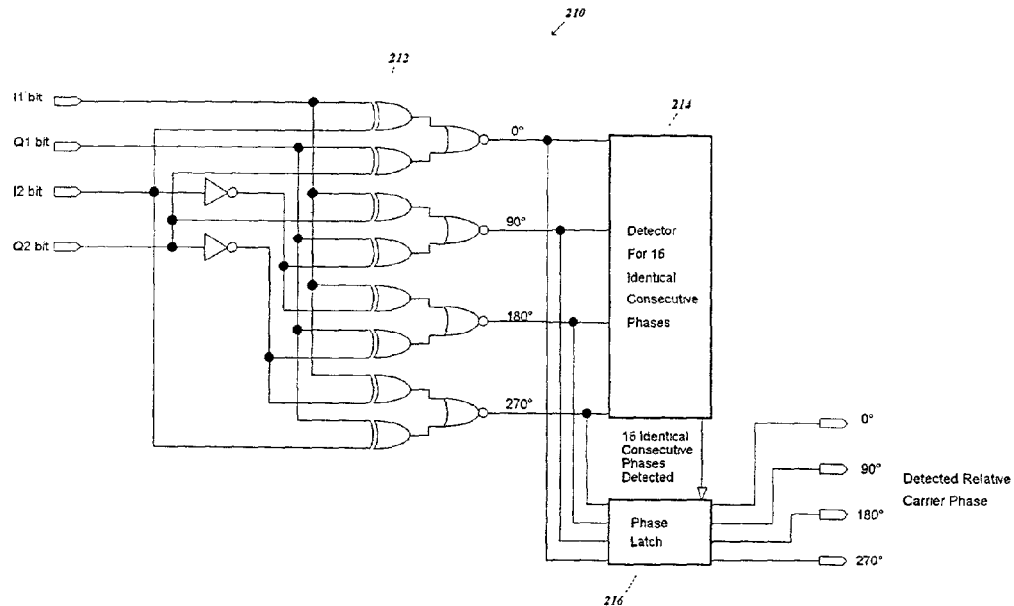
Data Align Multiplexer
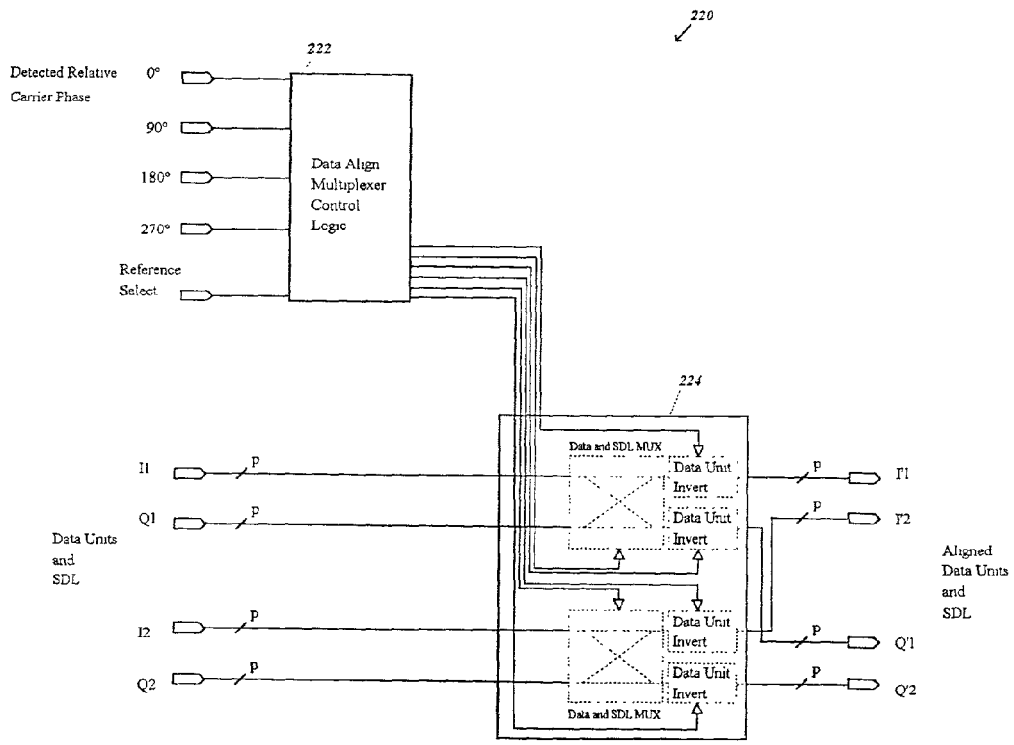

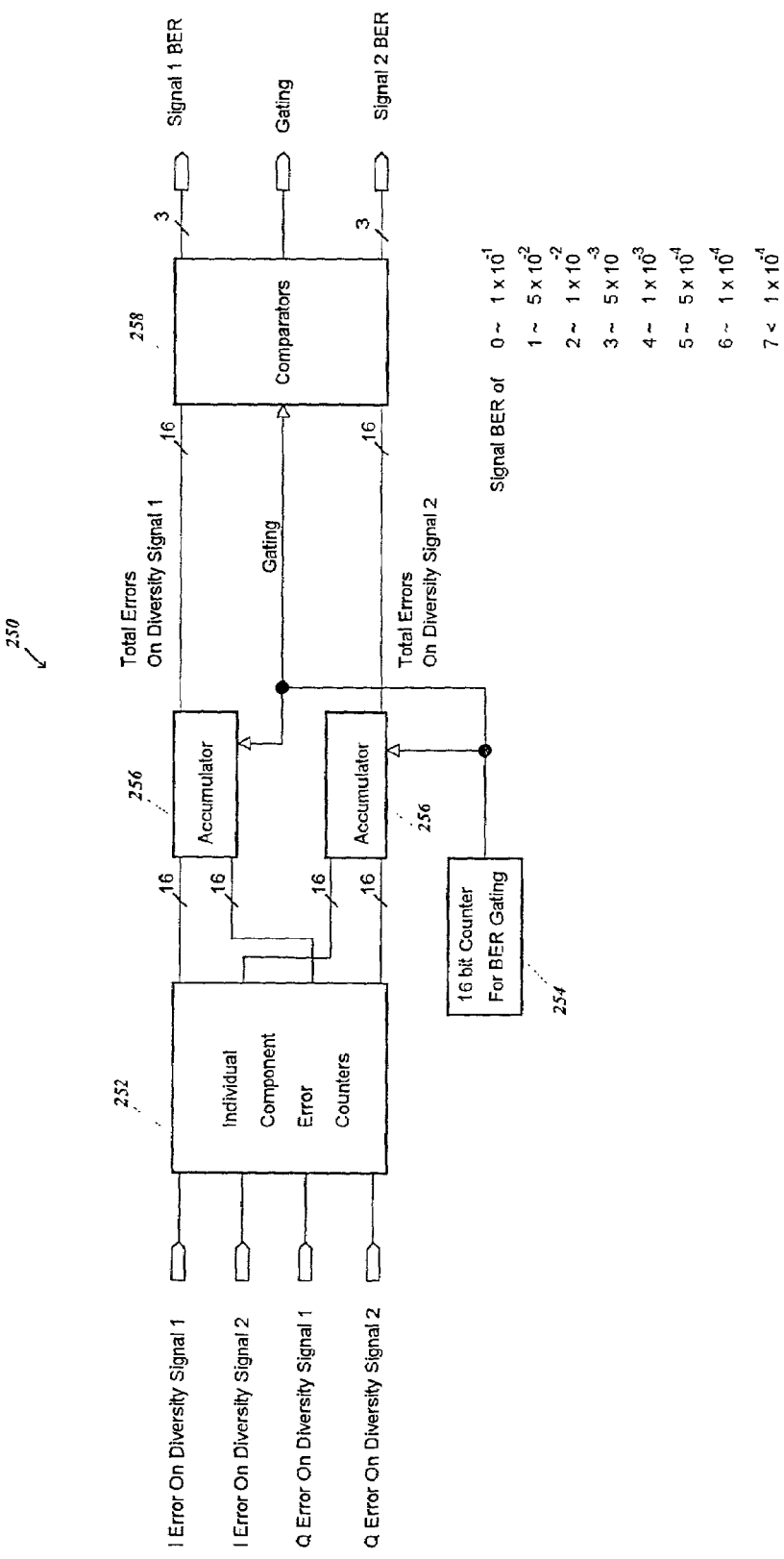
Fig. 9 BER Detector

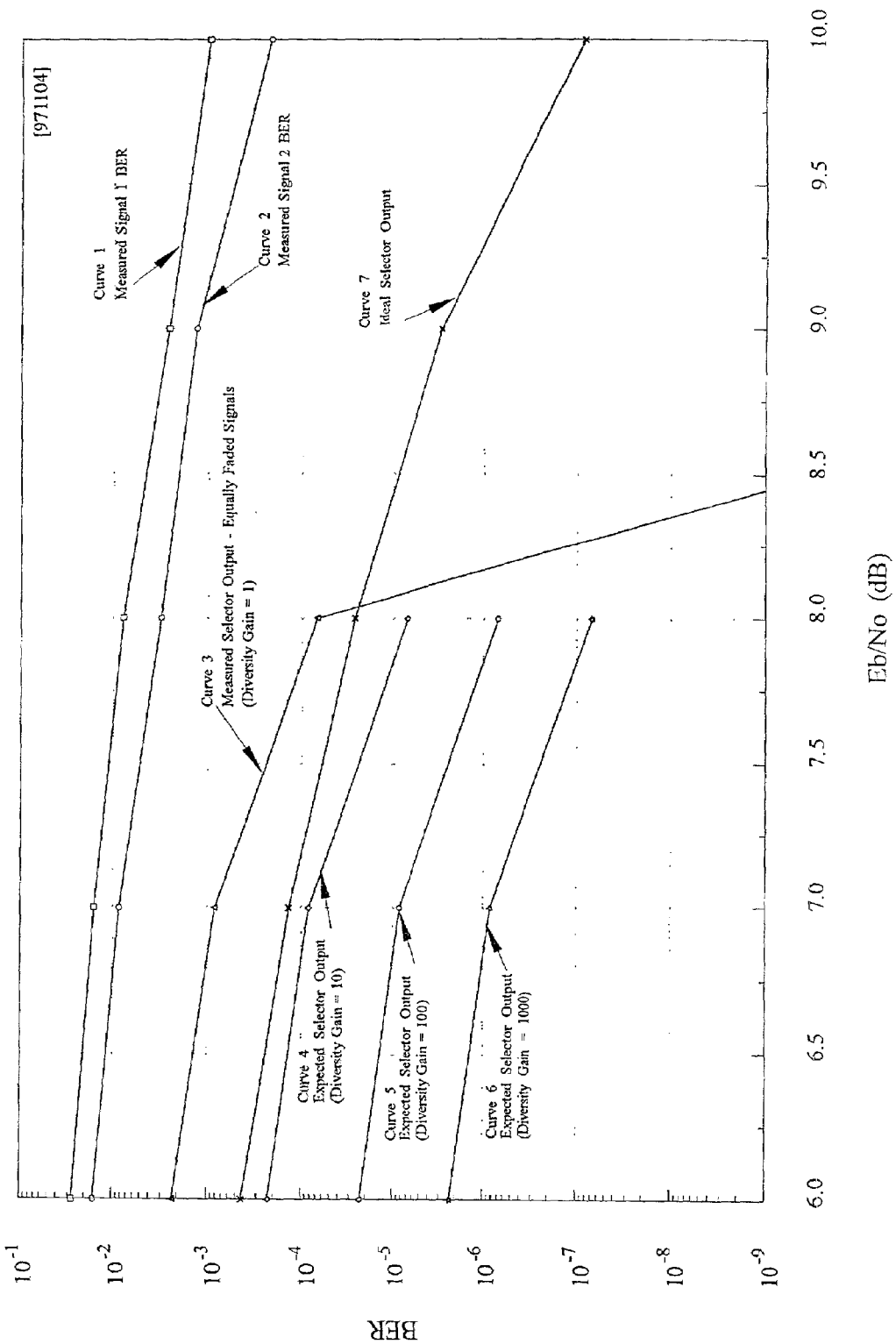
Fig. 10 Expected and Measured BER for 9QPR Radio Using Diversity Signal Selection

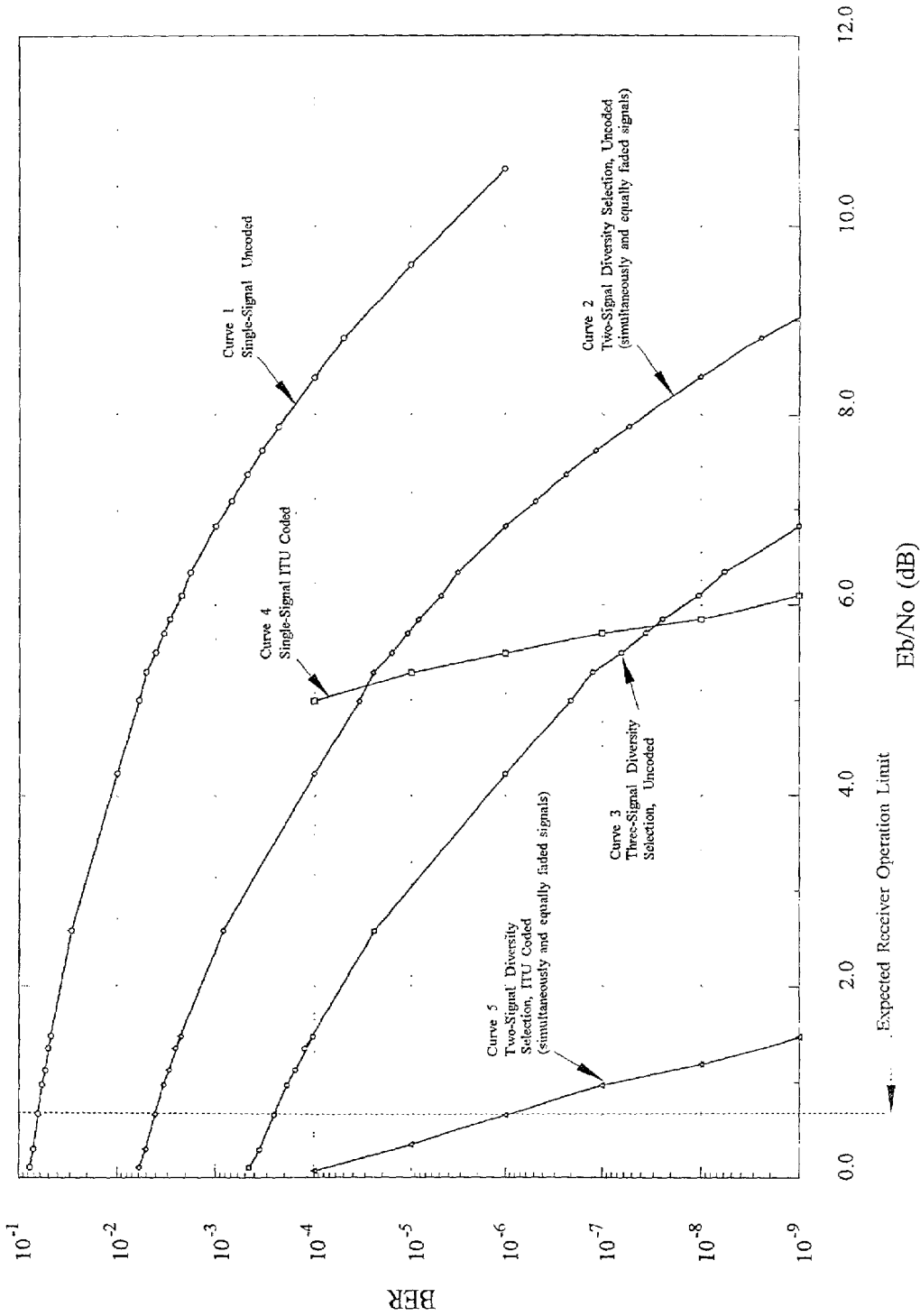
Fig. 11 Expected BER Characteristics of Unprotected and Diversity Protected QPSK Radio

DIVERSITY COMMUNICATION SYSTEM AND METHOD OF OPERATION THEREOF

This is a continuation of application Ser. No. 09/610,629 filed on Jul. 5, 2000 now abandoned, which is a continuation of Ser. No. 09/071,301 filed on May 01, 1998 now abandoned.

TECHNICAL FIELD

The present invention relates to diversity data communications in which at least two radio diversity signals are processed on a data unit basis to determine which data units should be used as valid data when corresponding data units in the at least two radio diversity signals differ due to error bursts on any or all of the at least two radio diversity signals.

BACKGROUND ART

Diversity communications are a form of transmission and/or radio reception using several modes, using space and/or time to compensate for fading or outages in any one of the modes. In space diversity communications, two or more separate antennae receive the same radio signal which propagates simultaneously over several paths. If the paths are sufficiently different, independent propagation conditions could be expected. With time diversity communications the same path may be used, but the radio signal is transmitted more than once, at different times. There are other forms of diversity radio communications, using different frequencies, different polarizations, or different angle of arrival to provide diversity signals with different characteristics.

Diversity reception is a method of minimizing the effects of fading during reception of a radio signal. This is done by combining and/or selecting two or more sources of received/signal energy which carry the same intelligence but a different strength or signal-to-noise ratio in order to produce a usable signal. Diversity reception is widely and effectively used in commercial high-frequency installations. See *Modern Dictionary of Electronics, Sixth Edition,* Revised and Updated, Rudolf F. Graf, p. 281.

In terrestrial radio systems, the received signal usually consists of a major direct line of sight (DLS) component, and a few multipath (MP) components which are radiated in directions other than DLS and have been redirected by reflection, refraction or diffraction. Generally, these processes are unstable and the MP components' amplitude and phase fluctuate rapidly.

Usually, digital terrestrial radios operate with a dominant DLS signal and S/N of 30 dB or more. Under these conditions, data transmission performance is excellent. However, if the DLS component is attenuated by atmospheric defocusing or other unstable obstructions, and its amplitude becomes comparable to the MP components, the resultant received signal can experience rapid, intermittent deep fading. In terrestrial radios, such reception conditions are encountered during occasional anomalous signal propagation periods which can last for different time intervals with the probability of fading below a level of useful signal decreasing with increasing time. See U.S. Pat. No. 5,446,759. Such events are characterized by medium fades with occasional deep fade instants and intermittent data transmission problems in a form of short error bursts. See *Digital Radio-Nature of Impairment, Diversity Signal Characteristics and Effective Designs,* CRC Contract 67 CRC-5-2167, Nigrin and Polasek, 1996. It is during these events that the terrestrial radios experience most of their data transmission problems. In order to minimize these radio problems and achieve the required reliability, diversity antennae which provided suitable signals had to be used. The diversity signals were either combined in IF form using so-called maximum power combiners or were switched in the baseband. Unfortunately, both methods possessed flaws which prevented radio diversity transmission techniques from achieving their full potential. In maximum IF power combining, one diversity signal's phase was declared as the reference, and the other signal's phase was aligned to it. This asymmetrical approach fails when the reference signal experiences fading and its phase becomes unstable. See *Digital Radio Outage/Fade Characteristics and Applicability of Current Prediction Techniques,* CRC Report CRC-CR-94-002, Nigrin and Polasek, 1994.

Baseband switching, which was more expensive, was symmetrical and often performed slightly better. However, switching was done in milliseconds, initially based on signal power measurements which could not correctly identify which signal was experiencing error bursts at a given time. Later, many improvements were patented, such as a combination of fade and fade time rate or improvements based on channel estimation techniques, e.g. U.S. Pat. No. 5,351,274, or measurement averaging such as IF power, U.S. Pat. No. 5,325,403, or signal phase, U.S. Pat. No. 5,203,023. These techniques respond to average reception conditions and fail to make correct decisions when all (usually two) diversity signals experience intermittent error bursts. It is claimed that the diversity gain, i.e. the ratio of impaired seconds or severely impaired seconds of unprotected signals to impaired seconds of protected signals, increases with antenna separation and typically reaches hundreds. However, long term measurements showed that on bad radio hops, the gain is usually only tens. See *Digital Radio Outage/Fade Characteristics and Applicability of Current Prediction Techniques,* supra. These realistic diversity gain figure applies to 1975–85 radio designs which used only simple signal processing.

Currently, radios use complex signal processing, e.g. soft decision Viterbi demodulation, forward error correction (FEC) methods such as convolutional and block coding, etc., which translates into excellent data transmission performance improvements. It has been shown that if the conventional diversity techniques are applied to modern digital radios with sophisticated signal processing, the additional data transmission performance improvement is very small. See, *Field Performance of a 128 QAM 155 MB(s) Sonet Digital Radio System,* Boe et al, Globecom, 1991 at pp. 867–871. The diversity radio protected by both space and frequency diversity at the same time has not experienced any severely errored seconds (SES) compared to 7 SES of the unprotected radio. However, it recorded 92 errored seconds (ES) compared to 529 of the unprotected radio. Similar results obtained by other researchers raised questions about the need for diversity signal reception in view of its cost versus the actual gains. Boe's results document some weaknesses in the current digital radio designs. First of all, regardless of the signal processing complexity, radio systems which do not use diversity protection cannot provide a reliable data transmission performance when severe unstable multipath reception causes a bit error rate (BER) of $10^{-3}$ or worse. Second of all, conventional diversity techniques perform well when only one signal experiences error bursts, but are less effective during unstable multipath reception experienced by both diversity signals simultaneously. As a result, current diversity techniques do not seem to be adequate for mobile radio and other applications where radio waves propagate in close proximity to the ground and multipath signal reception is frequently encountered.

Other diversity communication techniques have been developed. See U.S. Pat. Nos. 4,384,358, 5,379,324, 5,402,451, 5,465,271, 5,487,091, 5,541,963, 5,566,364, 5,559,838 and 5,515,380. The U.S. Pat. No. 5,515,380 claims a method and a device which achieves significant performance improvements using diversity signal reception. The transmitted data are organized into blocks of bits. A block can be tens of bits long if parity bits are used or hundreds of bits long in case of FEC. Each block is augmented by adding error identification or correction bits, which upon signal reception and demodulation determine whether a given block contains errors. If a given block contains errors, the corresponding block received on the other diversity signal is hoped to be error free, in case of parity bit checking, or degraded to a lesser extent, in case of FEC block coding. The error-free, or better block, is selected to the output. However, when both diversity signals are affected by intermittent error bursts, the selection teelmique becomes ineffective. This is because parity bits ignore even number of errors and do not differentiate between single and a larger number of errors. FEC techniques use large data blocks which are likely to be similarly impaired by intermittent radio error bursts.

FIG. 1 illustrates a block diagram of a prior art space diversity communication system 10. The system includes a transmitter 12 which receives a baseband data input which modulates a carrier and transmits the modulated carrier from an antenna 14 through two separate transmission paths 16 and 18 to a pair of spaced apart antennae 20 and 22. These antennae are separated by a sufficient distance (e.g. a few wavelengths) to provide separate communication paths which are not subject to the same fading phenomena, such as Raleigh fading or other phenomena which degrade both transmissions 16 and 18 simultaneously. The received signal from antennas 20 and 22 is applied respectively to a pair of receivers 24 and 26. The output signals from the receivers 24 and 26 are applied to a combiner 28 which, as described above, functions to combine the output signals to produce a baseband output. The combiner 28 does not perform a comparison of respective streams of data units (e.g. bits) to choose and output individual data units as received from receivers 24 and 26 in circumstances where at least one difference in at least one data unit of a sequence of corresponding data units is identified and processing each data unit within the at least one difference of the sequence of corresponding data units to output data units having a higher probability of not being in error.

FIG. 2 illustrates a block diagram of a prior art frequency diversity system 30. A first transmitter 32 modulates a carrier of a first frequency with the baseband input and a second transmitter 34 modulates a carrier of a different frequency with the same baseband input. Antenna 36 broadcasts the respective modulated carriers 38 and 40 produced by transmitters 32 and 34 to a single antenna 42. The different frequency carriers are applied to receivers 44 and 46 which respectively process the data streams broadcast on carriers 38 and 40. Combiner 48 works in the same manner as combiner 28 of FIG. 2 and does not detect when at least one difference in at least one data unit of the sequence of data units transmitted by carriers 38 and 40 exists and thereafter processes each data unit within the at least one difference of the sequence of corresponding data units to output data units within each difference having a higher probability of not being in error.

FIG. 3 is a block diagram of a prior art radio transmitting system 50 which utilizes several techniques for improving digital radio data transmission performance. These techniques, which are all well known are provided by an outer forward error correction encoder 52 which adds error correction code to a data input. The output of the outer forward error correction encoder 52 is applied to an interleaver 54 which functions to rearrange the input data to result in a lower probability of consecutive transmission errors. The output of the interleaver 54 is applied to an inner forward error correction encoder 56 which adds inner forward error correction code. The output of the inner error forward error correction encoder 56 is applied to a modulator 58 which modulates a carrier with the composite of the data input which has been processed with outer and inner forward error correction code and interleaving. The output of the modulator 58 is applied to a transmitter 60 which amplifies the output of the modulator and applies it to antenna 62 which transmits the modulated carrier 64 to antenna 66. The output of the antenna 66 is applied to RF electronics 68. The output of the RF electronics 68 is applied to demodulator 70 which converts the signal back to its baseband form where it is subsequently processed by an inner forward error correction decoder 72 to decode the inner forward error correction code added by the inner forward error correction code encoder 56, by a deinterleaver 74 which reverses the effect of interleaving produced by interleaver 54 and by an outer forward error correction decoder 76 which performs the process of decoding the outer forward error correction code added by encoder 52. The data is outputted from the outer forward error correction decoder 76. The combination of outer and inner forward error correction code and interleaving produces a substantial reduction of errors caused by data transmission channel.

THEORETICAL BACKGROUND OF THE INVENTION

The following discussion describes in simplified mathematical terms some fuindamentals of digital radio communications, and the transformation and flow of digital information through a noisy communication channel. Digital data are transmitted by means of a digitally modulated carrier. Although there are different types of digital modulation, quadrature modulation will be used in the following discussion. In quadrature modulation, the input data stream is divided into two parallel data streams. Each data stream is a sequence of bits which are grouped into m bit long data units, where m depends on the modulation scheme, e.g. m=1 for QPSK, m=2 for 16 QAM etc. The two streams of data units are mapped into ($2^m$)-level signals $I_U(t)$ and $Q_U(t)$ (2-level for QPSK, 4-level for 16 QAM, etc.). The resultant time dependent payloads are defined as $$F_1(t) = [I_U(t), Q_U(t)] \qquad (1)$$

The $I_U(t)$ and $Q_U(t)$ components are applied to modulator 82 where they modulate sine and cosine components of intermediate frequency carrier. Summation of the quadrature components forms an intermediate frequency signal $F_2(t)$ defined by equation (2)

$$F_2(t) = I_U(t)\cos(\omega_M t) + Q_U(t)\sin(\omega_M t) \qquad (2)$$

The modulation carrier is typically between 10 and 140 MHz. The intermediate frequency signal $F_2(t)$ is applied to an upconverter 84 which multiplies it by local oscillator signal produced by the microwave MW oscillator 86. The resultant upconverted MW signal is filtered which causes transmitter intersymbol interference $IS_T$ resulting from L adjacent data units. The MW signal is applied to MW power amplifier 88 where it is amplified and outputted to transmitter antenna 90 to produce a signal $F_3(t)$ as follows $$F_3(t)=I_U(t)\cos(\omega_{MW}t)+Q_U(t)\sin(\omega_{MW}t)+IS_T(t,L)+N_T(t) \tag{3}$$

The transmitter noise $N_T$ is caused by non-linearities in the MW amplifier 88 and phase instabilities of the MW oscillator 86. A small fraction of the transmitted signals $F_3(t)$ is intercepted by the receiver antenna 92. The received signal is delayed by a transmitter/receiver antenna propagation time $\tau$ and its amplitude depends on the transmission medium transfer function $\gamma$. The receiver antenna signal $F_4(t)$ is defined by equation (4) as follows $$F_4(t)=\{I_U(t)\cos[\omega_{MW}t+\Phi(t)]+Q_U(t)\sin[\omega_{MW}t\Phi(t)]+IS_T(t,L)+N_T(t)\}[\gamma+N_\gamma(t)] \tag{4}$$

The received signal phase is defined by $$\Phi(t)=\omega_{MW}\tau=2\pi[f_{MW}\tau_o-M+f_{MW}\Delta\tau]=\Phi_o+\phi_N(t) \tag{5}$$

where $\Phi_o$ varies from 0 to $2\pi$, M is a very large number, e.g. at MW frequencies $M=10^6$, and $\Delta\tau$ is a propagation time instability. Due to multipath and other atmospheric propagation instabilities, the received signal phase $\Phi$ and amplitude $\gamma$ can significantly change in micro or milliseconds. The received signal phase and amplitude instabilities caused by a signal propagation medium are represented by $\phi_N(t)$ and $N_\gamma(t)$.

The output from the antenna 92 is applied to a low noise amplifier 94 which amplifies the received signal $F_4(t)$ by a factor $G_R$ and adds additional noise $N_R(t)$ to the signal. The amplified MW signal is applied to a down converter 96 which uses a local oscillator output from a MW oscillator 98 to shift the received signal to an IF band. The resultant intermediate frequency signal $F_5(t)$ is defined by equation (6) as follows:

$$F_5(t)=\{I_U(t)\cos[\omega_{IF}t+\Phi(t)]+Q_U(t)\sin[\omega_{IF}t+\Phi(t)]+IS_T(t,L)+N_T(t)\}[\gamma+N_\gamma(t)]G_R+N_R(t) \tag{6}$$

The IF signal is applied to an AGC IF amplifier 100 which outputs an amplified IF signal which is applied to demodulator 102. Since the demodulator 102 requires an IF signal with a constant amplitude, the AGC amplifier 100 controls its gain K in accordance with equation (7) as follows:

$$[K+k(t)]RMS[F_5(t)]_{Max\ Symbol}=1 \tag{7}$$

At large K values, when the MW signal experiences deep fading, the IF gain instabilities which are expressed by $k(t)$ can become significant and change in micro or milliseconds.

After final filtering, which introduces receiver inter-symbol interference $IS_R(t)$, the demodulator 102 input signal $F_6(t)$ is expressed by equation (8) as follows:

$$F_6(t)=F_5(t)[K+k(t)]+IS_R(t,L) \tag{8}$$

Equation (8) can be written as equation (8a) as follows:

$$F_7(t)=C(F_6)\cos[\omega_{IF}t+\Phi(t)]+S(F_6)\sin[\omega_{IF}t+\Phi(t)] \tag{8a}$$

where $C(F_6)$ and $S(F_6)$ are cosine and sine parts of $F_6(t)$ and include all noise terms.

The demodulator 102 derives an IF carrier which is expressed by equation (9) as follows:

$$D(t)=\sin[\omega_{IF}t+\delta_o+\Delta(t)] \tag{9}$$

where the quasi-steady phase $\delta_o$ changes slowly in time, and $\Delta(t)$ represents demodulator phase lock loop (PLL) instabilities. Using the carrier defined by equation (9), the demodulator 102 converts the IF signal into the following baseband waveforms as defined by equations (10) and (11) below.

$$I(t)=C(F_6)\cos[\Phi(t)-\delta(t)]+S(F_6)\sin[\Phi(t)-\delta(t)] \tag{10}$$

$$Q(t)=S(F_6)\cos[\Phi(t)-\delta(t)]+C(F_6)\sin[\Phi(t)-\delta(t)] \tag{11}$$

If two MW signals are received by two different receivers, and if the signals are sufficiently strong, e.g. about 16 dB above a signal level which results in a bit error rate of $10^{-5}$, both demodulator carriers are almost phase aligned with their respective transmitter carriers, i.e. as defined by equation (12) as follows:

$$\Phi_1(t)-\delta_1(t)=P_1\frac{\pi}{2};\ \Phi_2(t)-\delta_2(t)=P_2\frac{\pi}{2}\{P_1,P_2=0,1,2,3\} \tag{12}$$

The P factor expresses the $\pi/2$ carrier alignment uncertainty. Without loss of generality, it can be assumed that $P_1=P_2=0$. Equations (10) and (11) then simplify to equations (13)–(16) as follows:

$$I_1(t)=I_{U1}(t)+IS_{I1}(t,L)+N_{I1}(t,IS_T,N_T,N_\gamma,\phi,N_{R1},K_1,k_1IS_{R1},\Delta_1) \tag{13}$$

$$I_2(t)=I_{U2}(t)+IS_{I2}(t,L)+N_{I2}(t,IS_T,N_T,N_\gamma,\phi,N_{R2},K_2,k_2IS_{R2},\Delta_2) \tag{14}$$

$$Q_1(t)=Q_{U1}(t)+IS_{Q1}(t,L)+N_{Q1}(t,IS_T,N_T,N_\gamma,\phi,N_{R1},K_1,k_1IS_{R1},\Delta_1) \tag{15}$$

$$Q_2(t)=Q_{U2}(t)+IS_{Q2}(t,L)+N_{Q2}(t,IS_T,N_T,N_\gamma,\phi,N_{R2},K_2,k_2IS_{R2},\Delta_2) \tag{16}$$

Equations (13)–(16) describe cyclostationary processes where the first two terms are deterministic factors related to the transmitted data sequence. Assuming that receivers of the same designs are used, and that the same data are sent on both signals 1 and 2, the corresponding pairs of deterministic components $I_{U1}$, $I_{U2}$ and ($Q_{U1}$, $Q_{U2}$), and the corresponding pairs of intersymbol interference terms ($IS_{I1}$, $IS_{I2}$) and ($IS_{Q1}$ and $IS_{Q2}$) are identical during normal reception conditions. The third $N_I$ or $N_Q$ terms are chaotic assemblies composed of Gaussian distributed random variables each representing random noise from a particular source. These noise assemblies can be described as wide sense stationary processes which are characterized by zero mean, and a standard deviation of $d_N$ which is related to the noise power of the various noise sources. In digital signal modulation, the time instant where the noise assembly amplitude exceeds the deterministic signal component, and the duration of such event determines whether a demodulation error will be caused. The probability of a demodulation error which is proportional to the measured signal Bit Error Rate (BER), can be described by statistical properties of the modulation signal, inter-symbol interference, and the signal-to-noise ratio (S/N).

Laboratory studies on 9QPR modulated diversity radio signals which were received by radios of the same design show that the baseband waveforms of the corresponding demodulated signal pairs ($I_1$, $I_2$) and ($Q_1$, $Q_2$) are almost identical, with only small instantaneous deviations, as long as both received signals are strong. During such conditions, the I and Q samples, which are measured at the data unit decision time instants (slicing points), are found inside normal ranges which are centered about mean voltage levels representing each data unit. When one or both signals become weak, such that their BER=$10^{-4}$ or worse, the corresponding I signals and Q signals can deviate significantly from each other due to their large noise components and the measured data unit samples show a much larger spread. If the various noise components add constructively and their resultant amplitude momentarily exceeds the signal modulation component amplitude, the affected data unit sample may appear in the wrong data unit voltage space. Consequently, the data unit can be demodulated incorrectly.

The noise components in equations 13–16 are random and statistically independent quantities, unless one or more major noise sources are common to both diversity receivers. Although this fact is intuitively obvious, laboratory studies of noisy radio signals indeed confirm that error bursts occurring on two or more diversity signals are statistically independent events. Therefore, the probability that errors will occur simultaneously on N diversity I or Q components (quadrature modulation is assumed) can be expressed as:

$$BER(I_1, I_2, \ldots, I_N) = \prod_{n=1}^{N} BER_{I_n} \quad (17)$$

$$BER(Q_1, Q_2, \ldots, Q_N) = \prod_{n=1}^{N} BER_{Q_n} \quad (18)$$

where $BER_{I_n}$ and $BER_{Q_n}$ are bit error probabilities of the $n^{th}$ signal component. Furthermore, experimental data indicates that $$BER(I_n, Q_n) = BER_{I_n} \cdot BER_{Q_n} \quad (19)$$

which implies that error bursts on the I and Q components of a given diversity signal seem to be also independent.

The statistical independence of errors on N diversity signals is an important consideration for error identification and correction as described in this patent.

DISCLOSURE OF THE INVENTION

The term data unit or diversity data unit, which will be used throughout the rest of the patent description is defined as a unit of information comprising single or more bits, depending on the carrier modulation scheme (e.g. 1 bit in QPSK, 2 bits in 16 QAM. etc.). Without loss of generality, quadrature modulation will be assumed in the descriptions and examples used in this patent. Therefore, a data unit pertains to each in-phase (I) and quadrature (Q) diversity signal modulation components separately. The data units corresponding to the I and Q modulation components can be referred to as the I data units and Q data units respectively. However, since the I and Q diversity signal components are processed similarly and separately, the term data unit will usually be used without specifying the I or Q prefix. A data unit duration is defined as a modulation symbol period and will hereinafter be referred to as $T_s$.

The present invention is a diversity radio reception process and a diversity radio receiving system in which intermittent error bursts can be occurring in any data unit of at least two received diversity radio signals. In this circumstance the intermittent error bursts represent essentially independent statistical events. Each diversity radio signal usually contains I and Q components each containing a sequence of corresponding data units which are each subject to intermittent error bursts of E data units in duration. If the corresponding components of at the least two diversity radio signals are processed so that corresponding data units of the at least two diversity radio signals are compared, differences therebetween represent errors in data units on one diversity signal. Based upon statistical properties of error bursts, only a very small number of data units are impaired simultaneously in the at least two diversity radio signals. As a result, selection of diversity signal data units which have the smallest probability of containing an error can significantly improve diversity radio data transmission performance. If the diversity signal selection technique is used inside of FEC block coding, essentially perfect radio data transmission performance can be achieved.

A diversity radio reception process in accordance with the present invention includes receiving at least two diversity radio signals each containing a sequence of corresponding data units which are each subject to an intermittent error burst of Y data units in duration where Y is an integer equal to at least 1; applying hard decision demodulation to baseband signals to obtain data units; characterizing each data unit by a baseband signal deviation (SD) level indicating the amount by which the demodulated I(t) and Q(t) signals (quadrature modulation assumed) deviate from their mean value at the data unit decision instant and, for each data unit, generating a word containing the data unit bits and the deviation level (SD) bits; removing the receiver carrier phase uncertainty of the at least two diversity signals by arranging the orthogonal component sequences of data units of the at least two demodulated diversity signals into two groups such that one group is aligned with the in-phase (I) data units of the reference signal and the other with the quadrature (Q) data units of the reference signal; comparing corresponding data units of the sequence of data units of the at least two diversity radio signals to identify at least one corresponding data unit in the at least two diversity radio signals which differs; when no difference in at least one corresponding data unit is identified, outputting one of the at least two sequences of corresponding data units; and when at least one difference in at least one data unit of the sequence of corresponding data units is identified, processing each corresponding sequence of data units with the at least one difference and outputting the sequence of data units within each difference having a higher probability of not containing errors. The processing of each sequence of corresponding data units with at least one difference includes processing of data unit modulation signals I(t) and Q(t) (quadrature modulation assumed), for each of at least two diversity signals, to derive the data unit baseband signal distortion parameters for each data unit within each difference and one or more data units immediately adjacent to the difference in order to determine for each sequence of corresponding data units with at least one difference the resultant estimated probability that at least one data unit is incorrectly demodulated. The data unit baseband signal distortion parameters are related to the signal deviation SD by some function f( ), i.e., for each data unit with a signal deviation SD, the signal distortion is defined as f(SD). One or more data units immediately adjacent a beginning and ending data unit of each difference are processed; each error burst is Y data units; and each difference in at least one data unit of the sequence of corresponding data units is identified after data units of the sequence of the at least two diversity radio signals have been delayed by a fixed delay of (E+P)

data units which is longer than the longest possible detected error burst of E data units plus a processing delay of P data units. Each difference may be at least one data unit in duration with the beginning and ending data units being one data unit or the beginning and ending data units being different data units.

Differing data units corresponding to at least two diversity signals and one or more data units immediately adjacent to the differing data units are assigned a weight. The weight is used to scale the baseband signal distortion parameters corresponding to the differing data units and one or more data units immediately adjacent to the differing data units of the at least two diversity signals. For each diversity signal, the scaled distortion parameters corresponding to the differing data units and one or more data units immediately adjacent, are summed. The smallest total identifies the diversity signal which has the highest probability of containing correct data units in the sequence of at least one differing data unit. The data units corresponding to the diversity signal which was identified as having the highest probability of containing the correct data units in the sequence of at least one differing data unit, are used as the output data units. This method for identifying the diversity signal which has the highest probability of containing correct data unit or units in the event that at least one corresponding data unit in at least one other diversity signal differs, may be subject to special optimization criteria specific to a given radio design. These optimization criteria may take into account factors such as the actual number of corresponding data units which differ on the at least two diversity signals, specific data unit sequence, and others. Various types of FEC code, well known in prior art, may be added to the data prior being processed by the radio hardware, in order to further reduce errors in the data.

Because the I and Q components (quadrature modulation assumed) of the at least two diversity signals are processed independently, the I and Q data units at the selector output, during a given symbol period, can each belong to a different diversity signal.

The diversity radio signal reception process further includes after reception of the at least two diversity radio signals declaring one diversity radio signal a reference signal for resolving relative carrier phase difference between diversity receivers, and deriving a clock signal from the reference signal and using the clock signal as a time reference during the baseband processing of the at least two diversity radio signals; determining an error rate in the reference signal; comparing the determined error rate with the first maximum allowable error rate to determine if the clock signal is to be used as the time reference and when the error rate is greater than the first maximum allowable error rate using a clock signal from one of the other diversity radio signals as a new time reference as long as the error rate in the one of the other diversity radio signals is not greater than a second maximum allowable error rate. The first and second maximum allowable error rates are different with the first maximum allowable error rate being greater than the second maximum allowable error rate. A fixed delay of a transmission time of (E+P) data units is applied to each sequence of corresponding data units where P is a positive integer at least equal to 1 and one of the at least two sequences of corresponding data units is outputted after the fixed delay of (E+P) data units. The received at least two diversity radio signals are statically aligned within a fraction of a time duration of transmission of an individual data units in each of the at least two diversity radio signals. Preferably, the fraction is within 2.5% of the time duration of transmission of an individual data unit of the at least two diversity radio signals.

A data selector coupled to at least two radio receivers performs the foregoing processing of the corresponding data units of the sequence of data units of the at least two diversity radio signals.

BRIEF DESCRIPTION OF THE DRAWINGS

FIG. 6 is a block diagram of the signal data selector 200 of FIG. 5.

FIG. 7 is a block diagram of the Reference Signal and Global Clock Select logic.

FIG. 8 is a block diagram of the Data Alignment Logic (QPSK radios).

FIG. 9 is the block diagram of the BER Detector.

FIG. 10 shows the measured and theoretically predicted BER performance of the data selector using two equally poor diversity signals.

FIG. 11 shows the predicted BER characteristics of unprotected and diversity protected QPSK radio using FEC coded and uncoded data payloads.

PREFERRED MODE FOR CARRYING OUT THE INVENTION

Figure 1:
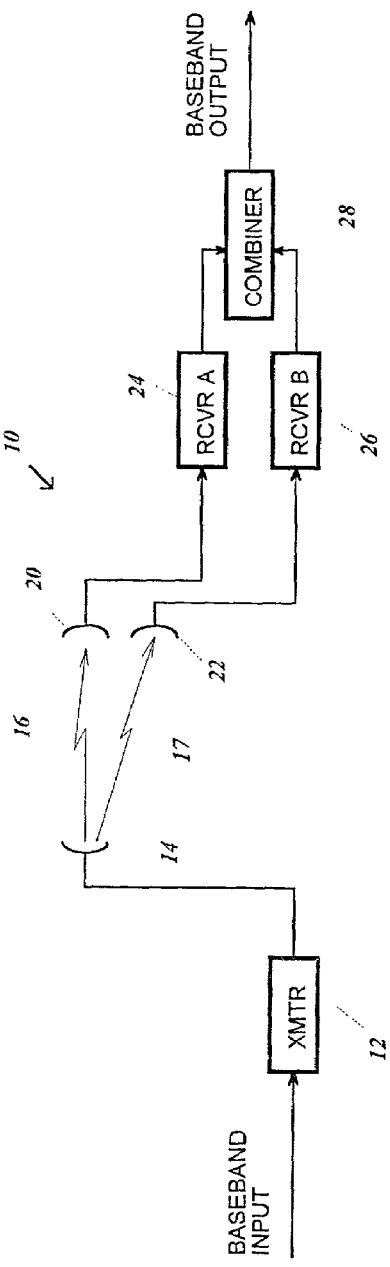
FIG. 1 is a diagram of a prior art space diversity radio transmission system.

The invention uses the statistical independence of error events which occur in received diversity radio signals, and are characterized by at least one erroneous data unit, to identify with a high probability which data unit(s) are to be outputted as valid data within an error burst. Error bursts are identified by comparing corresponding data units of at least two diversity data unit sequences. If the corresponding data units agree, the signals are most likely correctly demodulated and no further processing is performed. If the compared data unit(s) do not agree, at least one diversity signal is incorrectly demodulated. The signal corruption information over the errored and one or more immediately adjacent data units can then be used to identify the diversity signal(s) which is most likely incorrectly demodulated.

The present invention utilizes a diversity baseband signal selection technique based on the following steps. First, the diversity signals are received and demodulated by conventional methods. The demodulation consists of generating, for each of the at least two diversity signals, an m-bit I and Q data units (quadrature modulation assumed) from each sample of each digitized data unit modulation signal (baseband signal) I(t) and Q(t). The data unit baseband signal deviation (SD) levels are derived at the time of the demodulation. A 90° demodulator carrier uncertainty is removed in order to facilitate subsequent error detection by diversity signal data unit comparison. If no errors are detected, data units of any diversity signal (this will usually be the last signal selected) are passed to the data selector output as valid data. If a single error or error burst is detected in the at least two diversity signals, i.e. data units of the corresponding I or Q components disagree (quadrature modulation assumed), a sum of weighted distortion parameters f(SD) of the corresponding diversity signal components is used to identify the diversity data unit sequence which is most likely correct (non-erroneous), in the event of an error or error burst, the diversity data unit(s) which are least likely to be erroneous are multiplexed to the output, so that from the at least two diversity data unit sequences, one essentially error-free output data unit sequence is reconstituted.

Experimental studies on digital radios using 9QPR modulation have shown that the radio error bursts are random events which usually affect one to about 15 consecutive data units. As the S/N decreases, the error events which affect multiple consecutive data units appear more frequently.

Because of the statistical independence of the diversity signal error events, errors can be identified with a high probability by comparing corresponding data units of at least two diversity signals. If the data units agree, both signals are most likely correctly demodulated. If they do not agree, one diversity signal is incorrectly demodulated and ihe baseband signal distortion parameters of the errored and one or more immediately adjacent data units can be used to identify the diversity signal which is most likely in error.

Because the error burst detection process relies on a data unit comparison, errors which occur in all of the diversity signal components simultaneously cannot be corrected. Furthermore, if all diversity signals are experiencing an error rate of at least $10^{-2}$, the error signal identification procedure may be less efficient and result in additional errors appearing at the selector output. If two diversity signals are used, and one receiver looses synchronization due to a very poor S/N or hardware failures, only one receiver is synchronized. During such condition, the data selector will pass the other signal to the output. Therefore, any error burst on the synchronized signal appears at the selector output. Taking all possible error alternatives into account, the output bit error rate of the data selector, when two diversity signals are used, can be expressed as:

$$BER_D = \frac{1}{\tau_M}\Big(\tau_1(BER_{I1} + BER_{Q1}) + \tau_2(BER_{I2} + BER_{Q2}) + \frac{1}{\sigma}\int_0^{\tau_M-\tau_1-\tau_2}\{BER_{I1}(t)BER_{I2}(t)P[BER_{I1}/BER_{I2}] + BER_{Q1}(t)BER_{Q2}(t)P[BER_{Q1}/BER_{Q2}]\}dt\Big) \quad (20)$$

where $\tau_M$ is the bit error rate measurement period, $\tau_1$ and $\tau_2$ are fractions of $\tau$ during which only the first or second diversity signal is synchronized and $\sigma$ is the overall selector efficiency. $P[BER_{I1}/BER_{I2}]$ and $P[BER_{Q1}/BER_{Q2}]$ are conditional probabilities.

Figure 2:
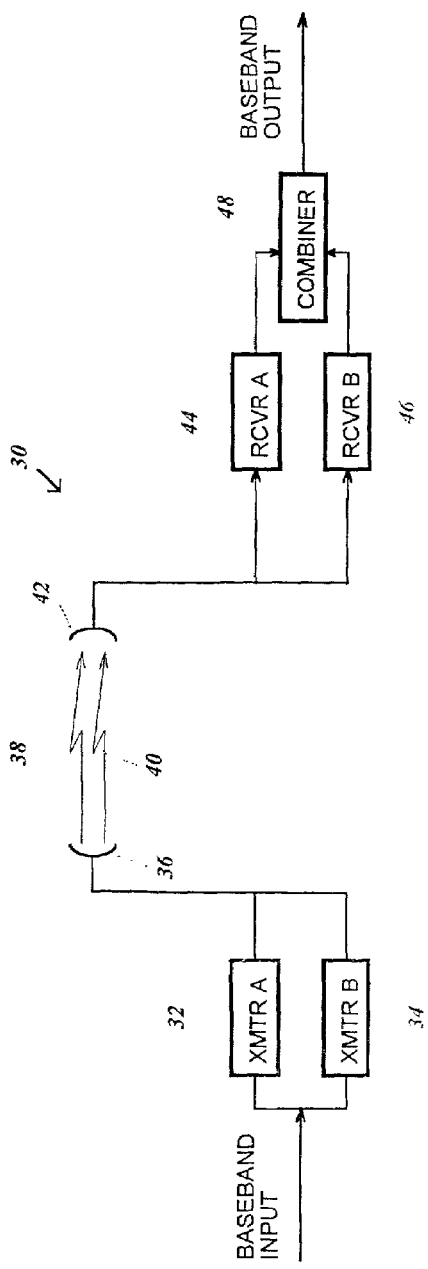
FIG. 2 is a diagram of a prior art frequency diversity radio transmission system.
Figure 3:
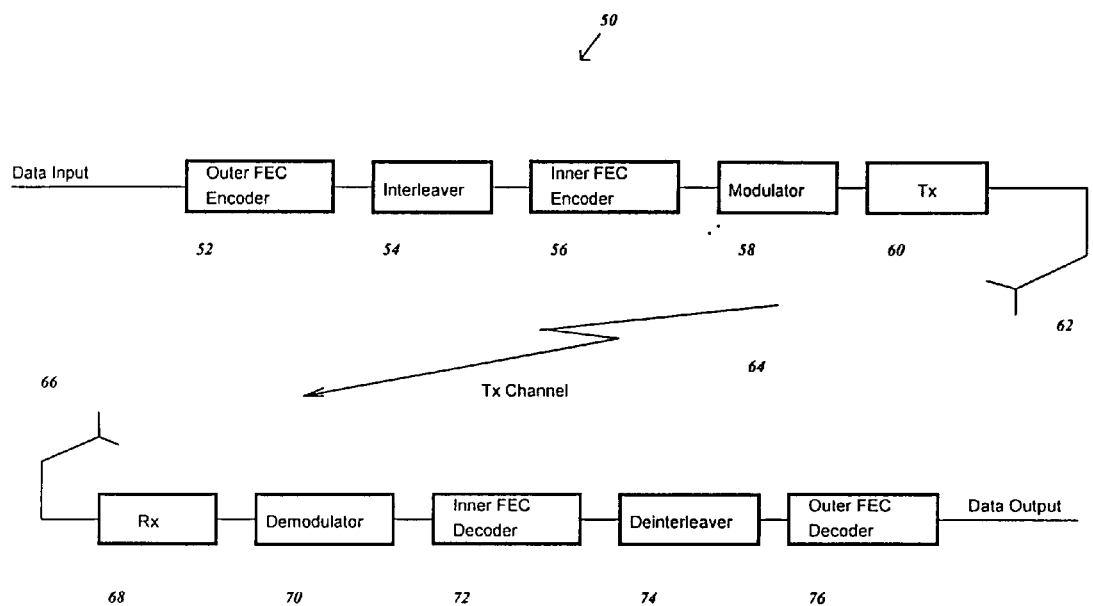
FIG. 3 is a block diagram of a prior art digital radio transmission system including inner and outer forward error correction code and interleaving.
Figure 4:
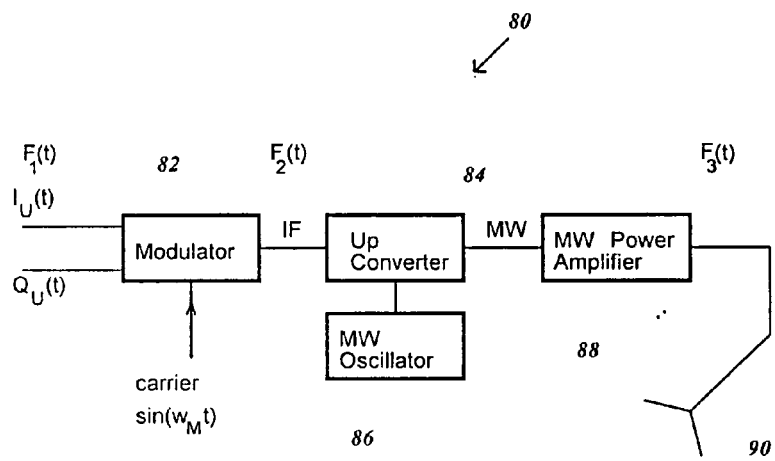
FIG. 4 illustrates a block diagram of a general digital radio data transmission system utilizing quadrature modulation.
Figure 4:
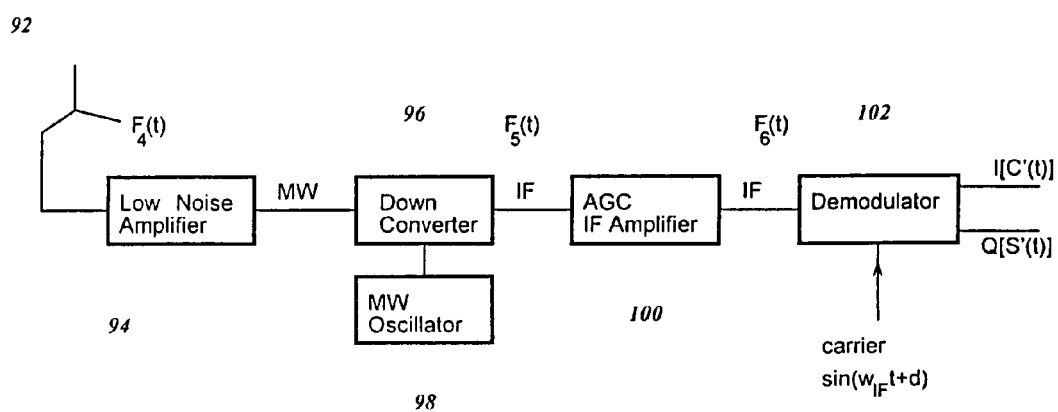

It should be understood that the overall process, with the exception of the data selection process described below in conjunction with FIGS. 5 and 6, may be practiced with a prior art diversity radio system components such as, but not limited to, the radio system components of FIGS. 1 and 2, except that the combiners 28 and 48 respectively therein are replaced with the data selector and further, preferably, employ error correction code to further improve the integrity of the transmitted data in accordance with the prior art of FIG. 3. The transmitter used with the present invention may be in accordance with FIG. 1 or 2 and further may include the outer and inner forward error correction encoders 52 and 56 and the interleaver 54 of FIG. 3. Furthermore, the individual signals that are outputted by the signal data selector 200 of FIGS. 5 and 6 if subjected to outer and inner forward error correction and interleaving are further processed with an inner forward error correcting decoder 72, a deinterleaver 74 and an outer forward error correction decoder 76 in accordance with the prior art of FIG. 3. In practice, the use of only outer forward error correction code as part of the invention results in almost errorless data transmission making the use of inner forward error correction code and interleaving unnecessary.

Figure 5:
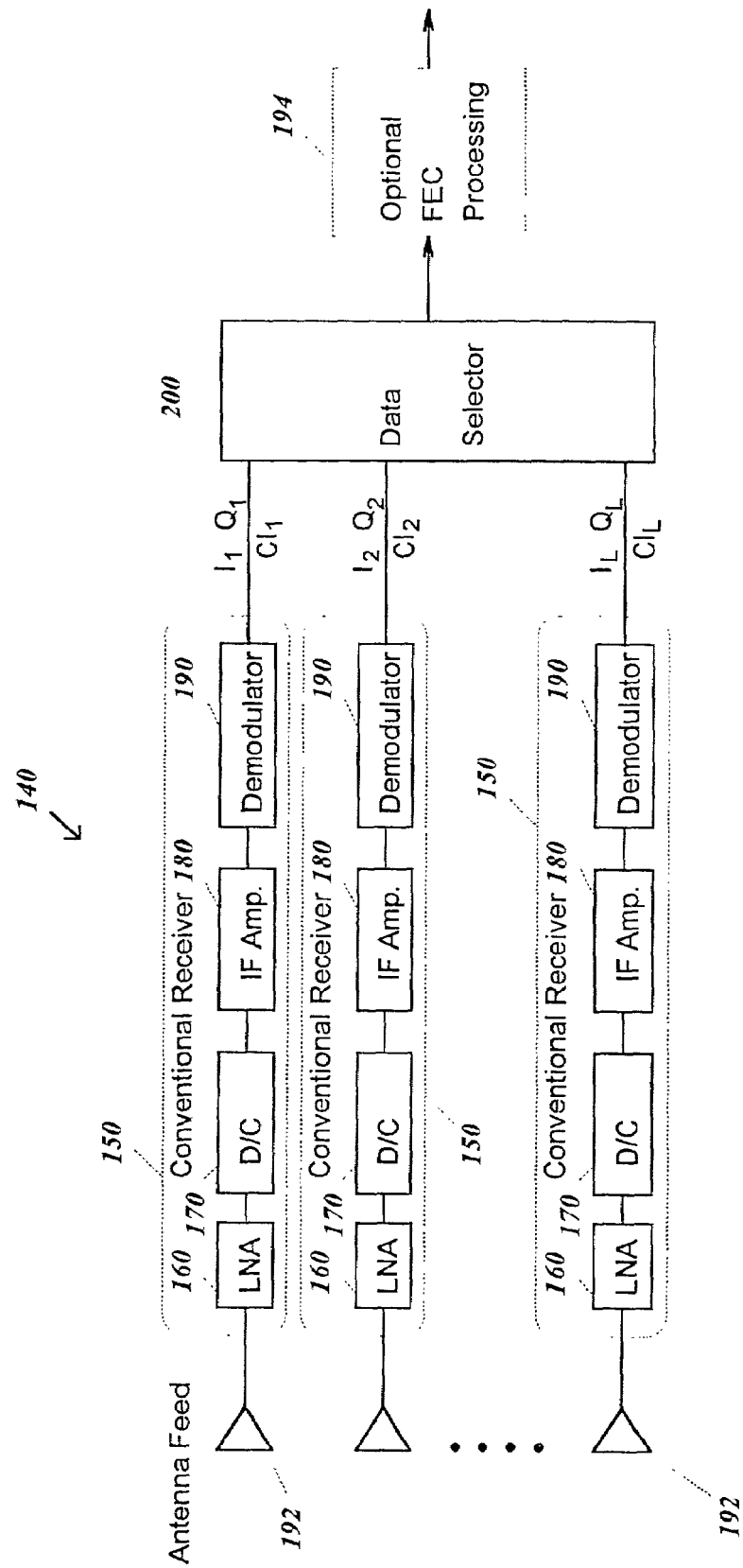
FIG. 5 is a block diagram of diversity radio receiving system in accordance with the present invention.

FIG. 5 illustrates a block diagram of a diversity radio receiving system 140 in accordance with the present invention. The transmitting source of the at least two diversity radio signals which are processed by the present invention may be in accordance with the prior art of FIGS. 1 and 2 or any other known source of transmitted radio diversity signals. The diversity radio receiving system 140 is generally in accordance with the prior art of FIGS. 1–3 with the exception of a signal data selector 200 which is described in detail below in conjunction with FIG. 6. The diversity radio receiving system 140 may have from 2 to L receivers. Each of the conventional receivers 150 is composed of an optional LNA 160, a downconverter 170, an intermediate frequency amplifier 180 and a demodulator 190 which may be of diverse constructions and utilize known designs. An antenna feed 192 may be identical to the antenna feed illustrated in the prior art of FIGS. 1 and 2 which provides an input of the individual L diversity radio signals. The demodulators 190 output in a preferred embodiment I and Q signals and a clock signal Cl. It should be understood that the baseband signal outputs of the individual demodulators 190 may be diverse in nature and may be analog or digital.

FIG. 6 illustrates a block diagram of the signal data selector 200 from FIG. 5 which uses output signals of two diversity receivers. The outputs of a pair of diversity receivers 150 in accordance with FIG. 5 are used as inputs. However, it should be understood that the system may be expanded to three or more receivers. The first input is represented by signals $I_1$, $Q_1$ and $Cl_1$ of a demodulated diversity signal 1 from a first receiver. The second input is represented by signals $I_2$, $Q_2$ and $Cl_2$ of a second demodulated diversity signal 2 from a second receiver. If demodulators 190 output analog I(t) and Q(t) signals, their clocks can be used in analog to digital converters 204 for deriving digital samples (slicing points) of the I(t) and Q(t) baseband signal for each of the at least two diversity signals. The digital samples may need to be filtered by an optional digital filter 206, if, for example, QPRS system is used and the demodulated signals are tree-level waveforms. The digital samples are subsequently sent to the Hard Demodulation and Signal Deviation Determination logic 208. If the outputs of demodulators 190 are digital, they are directly input to logic 208.

All diversity signal BER's and clocks are input to Global Clock Select logic 202, which is shown in a more detail in FIG. 7. Using diversity signal BER's, logic 202 declares one diversity signal as the reference signal and its clock as the global clock. The reference signal identified by Reference Select is used in the Relative Phase Detection Logic 210 and the global clock serves as a common timing signal for the entire selector system excluding the analog to digital converters. Any diversity signal can be declared the reference and remain reference until its bit error rate as detected by BER detector 226 becomes worse than a first BER threshold, such as $6\times10^{-3}$, and the other signal's bit error rate is better than a second BER threshold, such as 6×10⁻⁴. During normal reception conditions, the reference signal declaration is seldom changed.

Digital radio demodulators fail to provide a stable clock due to either hardware failures or severe multipath reception. The hardware failures can usually be distinguished by radio alarms of longer duration, such as a fraction of a second or more. In the event of hardware failure, the diversity data unit selection process is suspended and the data units corresponding to the stable signal are sent to the selector output. During a severe multipath reception, the signal selection process will be disabled only when the unstable signal's BER exceeds $10^{-1}$.

The Hard Demodulation and Signal Deviation Determination Logic 208 accepts the n-bit digitized I and Q samples for each of the at least two diversity signals. The n-bit samples represent a linear quantization of the analog I(t) and Q(t) signals into $2^n$ discrete levels which encode a given voltage range from −r to +r mV. The n-bit samples are converted into p-bit words containing m-bit long data units, where m depends on the modulation method (e.g. 1 bit for QPSK, 2 bit for 16 QAM etc.), and the corresponding two or more bit long signal deviation (SD) levels. For a simple illustration of hard decision demodulation and SD level determination, consider the following example. Assume that a QPSK demodulator produces I(t) and Q(t) analog signals which are centered around zero mV and have a full range of 320 mV (i.e. −160 to +160 mV). Assume also that a 6 bit analog to digital converter is used and forms the 6-bit samples S[k] in the full scale range of 320 mV. Therefore, the sample {011111} (31 decimal) will encode one quantization level below 0 mV, and {100000} (32 decimal) will encode one quantization level above 0 mV. Since QPSK modulation was assumed, the most significant bit of S[k] is the desired data unit, such that any sample below 0 mV is data unit "0" and any sample above 0 mV is data unit "1". To illustrate the generation of SD levels, let us assume that the mean sample levels below and above 0 mV are −70 mV and +70 mV respectively. If, for example, encoding of the SD levels by using two bits is chosen, a mapping scheme such as follows can be used:
{00}: (+31 to +110) mV or (−31 to −110) mV
{01}: (+16 to +30) mV or (+121 to +145) mV
{10}: (+15 to −15) mV
{11}: (+146 to +160) mV or (−146 to −160) mV (A similar scheme was found useful for QPR radios where the signal overshoots are important. However, for practical purposes, more than two bits are generally required.)

Therefore, if a 6-bit sample S[k] is +90 mV the logic 208 would form a 3 bit word {100} where 1 is the data unit and 00 is the SD level. If S[k] is −15 mV, the 3 bit word produced would be {010}.

Demodulation carrier phase recovery is associated with uncertainty which results in the I and Q data units of one diversity radio signal being possibly 00, 90°, 180° or 270° relative to the I and Q data units of the other diversity radio signals. For example, if one demodulator carrier is locked to the transmitter carrier with a 0° phase, and the second demodulator carrier is locked to the same transmitter carrier with a 180° phase, the I signal from the first demodulator will appear to be the inverse of the I signal from the second demodulator. Similarly, the Q signal from the first demodulator will appear to be the inverse of the Q signal from the second demodulator. Therefore, in order to make the I signals and the Q signals correspond to each other in this particular case, it would be required that the I and Q signals of one demodulator be inverted. Conventionally, the carrier phase uncertainty is resolved by differential coding. This approach cannot be used in the selector design as described here, because by the process of differential decoding, the signal deviation information for each demodulated data unit would be lost.

The relative carrier phase detector 210 receives the m-bit long data units and determines the relative phase between the reference data units and at least one other diversity radio signal's data units. FIG. 8 shows in a more detail, the relative carrier phase detector 210 for a QPSK system, where the data units are 1 bit long. It is assumed that only two diversity signals are used. The $I_1$, $Q_1$, $I_2$ and $Q_2$ data units are input to a logic 212 which identifies the relative phase. If the relative phase remains unchanged for a given number of consecutive symbol periods $T_s$, e.g. 16 $T_s$, it is stored in phase latch 216. The latched phase information remains unchanged until different relative phase is detected for sixteen consecutive symbol periods $T_s$. This condition may occur when one of the diversity signals briefly drops below the noise level of its receiver. The phase information is processed in the Data Align Multiplexer Control Logic 222, which is a part of the Data Align Multiplexer 220, as shown in FIG. 8, and sent to multiplexers and inverters 224. The multiplexers cross-connect the incoming p-bit words while the m-bit data units may also be inverted, such that the phase uncertainty is removed and the corresponding data units of $I_1'$ and $I_2'$ as well as $Q_1'$ and $Q_2'$ can be compared. The cross-connect operation applies to both the data units and the corresponding SD levels, however, the inversion may be applied to data units only. The Reference Select input generated in the Reference Signal Decision Logic 203 selects the current reference signal. Only the p-bit words which correspond to the non-reference diversity signal are cross-connected.

The Error/Error Sequence Detector and SD Processing and Weighting Logic 230 accepts the aligned p-bit words $I_1'$, $Q_1'$, $I_2'$ and $Q_2'$ and applies a function f( ) to all SD levels to produce distortion parameters f(SD). It detects errors by comparing the corresponding data units, and, if a difference is found, scales the corresponding f(SD) parameters to calculate weighted distortion quantities (WD) which are accumulated to obtain error decision values ED during an occurrence of an error burst. Consider an error sequence on the I data units, which starts at $n^{th}$ symbol and has a duration of Y symbols, such that $$I_1(r) \neq I_2(r), r=n, n+1, \ldots, n+Y \qquad (21)$$

where $I_1(r)$ represents the data units of the diversity signal $S_1$, and $I_2(r)$ represents the data units of the diversity signal $S_2$. $WD_{I1}$'s and $WD_{I2}$'s are calculated for the corresponding $I_1$ and $I_2$ data, for all the Y error symbols and for the i correct symbols immediately adjacent to the Y errors in accordance with the following equations:

$$WD_{I1}(k) = f(SD_{I1}(k)) \cdot W(k) \qquad (22)$$

$$WD_{I2}(k) = f(SD_{I2}(k)) \cdot W(k) \; k=n-i, n, \ldots, n+Y+i \qquad (23)$$

where i specifies how many symbols immediately adjacent the error symbol(s) are considered. For example, k=n−1 refers to the symbol immediately before the error burst and k=n+Y+1 refers to the symbol immediately after the error burst. f(SD(k)) is the signal distortion parameter written as a function of the baseband signal deviation level SD. W(k) is a weighting function which scales the distortion parameter depending on the information content at a specific position k in the error event. For example, the experimental study of 9QPR signals have shown that the signal distortion parameters of the first and last symbol in an error burst, and of the correct symbols immediately adjacent to the error burst symbols are the strongest identifiers of the impaired signal. Therefore, in that particular case, these parameters were scaled by the largest weighting value. On the other hand, the signal distortion parameters corresponding to the symbols in the central part of the error burst were multiplied by a lower weight value.

The WI accumulators 232 sum the WD values for k=n−i, n, . . . , n+Y+i to produce the error decision value ED. To complete the error event example on the I data, the ED for $I_1$ and $I_2$ are calculated as follows:

$$ED_{I1} = \left[\sum_{k=n-i}^{n+Y+i} WD_{I1}(k)\right] + \alpha = \left[\sum_{k=n-i}^{n+Y+i} f(SD_{I1}(k)) \cdot W(k)\right] + \alpha \quad (24)$$

$$ED_{I2} = \left[\sum_{k=n-i}^{n+Y+i} WD_{I2}(k)\right] + \alpha = \left[\sum_{k=n-i}^{n+Y+i} f(SD_{I2}(k)) \cdot W(k)\right] + \alpha \quad (25)$$

Where $\alpha$ is the algorithm optimization factor used to optimize the error decision algorithm for a specific digital radio system. For example, this factor may be used to add special weight adjustments depending on the error or number of errors in an error burst or to adjust the ED factor in case it is the same for both diversity signals. The procedure is identical if error(s) occur on the Q data unit stream. The corresponding equations used are:

$$Q_1(r) \neq Q_2(r) \quad r=n, n+1, \ldots, n+Y \quad (26)$$

$$WD_{Q1}(k) = f(SD_{Q1}(k)) \cdot W(k) \quad (27)$$

$$WD_{Q2}(k) = f(SD_{Q2}(k)) \cdot W(k) \quad k=n-i, n, \ldots, n+Y+i \quad (28)$$

$$ED_{Q1} = \left[\sum_{k=n-i}^{n+Y+i} WD_{Q1}(k)\right] + \alpha = \left[\sum_{k=n-i}^{n+Y+i} f(SD_{Q1}(k)) \cdot W(k)\right] + \alpha \quad (29)$$

$$ED_{Q2} = \left[\sum_{k=n-i}^{n+Y+i} WD_{Q2}(k)\right] + \alpha = \left[\sum_{k=n-i}^{n+Y+i} f(SD_{Q2}(k)) \cdot W(k)\right] + \alpha \quad (30)$$

ED values for the impaired I or Q streams are compared in the I or Q Error Decision Logic 234, where the signal which has larger ED value is identified as the impaired signal. The ED value pertains to an individual error event which may consist of a single isolated error, or a group of consecutive errors of at least two data units.

As already pointed out, the number of A/D quantization levels, f( ), SD(k), i, and W(k) may be arbitrarily chosen and will usually be different depending on the characteristics of a particular digital radio hardware. For example, in the selector emulation using real 9QPR digital radio baseband signals, excellent results were obtained with 6 bit A/D. i was equal to 1, i.e. only one symbol adjacent to the beginning and end of error burst was considered. Furthermore, SD(k) was a four bit number representing absolute baseband deviation from the mean value at the symbol decision instant. W(k) was equal to 1 for all k, i.e. no weighting was done, and f( ) was a power-of-two multiplier approximating $f(SD) \approx SD^2$.

The data unit delay lines (FIFOs) 236 delay all data units so that error decision calculation may be completed before potential errors or error bursts reach the data unit selection logic 238. Therefore, the data unit delay FIFOs 236 produce a delay of (E+P) data units which is longer than the longest possible detected error burst of E data units plus a processing delay of P data units. All decisions regarding the I and Q data unit error bursts which are propagating through the data unit delay FIFOs 236 are stored in the corresponding error decision queues 240. The data selection logic 238 does not take any action until it detects the leading error in corresponding data units (i.e. $I_1 \neq I_2$, or $Q_1 \neq Q_2$) at the output of the data unit delay FIFOs 236. When the leading error is detected, the data selection logic 238 reads the next error decision from the appropriate error decision queue 240 and routes the correct I or Q data unit(s) to the selector output. After the error or consecutive errors of an error burst have ceased, the selector remains in the last state, until the next leading error is detected at the output of the data unit delay FIFOs 236. At that time, the selector 238 again reads the next error decision from the appropriate error decision queue 240 and switches routing path, if required, to route the correct I or Q data unit(s) to the selector output. Since the I data streams and Q data streams are processed in parallel, the signal selector logic 238 can output I and Q data units each belonging to a different diversity signal. This allows the data selector 200 to reconstruct a good output signal even if the diversity signals experience a bit error rate of $10^{-2}$ or worse, simultaneously.

The BER Detector 250 measures approximate BER of each diversity signal, e.g. in the range from $1 \times 10^{-4}$ to $1 \times 10^{-1}$. A more detailed diagram of this device is shown in FIG. 9. The input consists of error pulses which indicate errors in the I and Q data units of the two diversity signals. The number of error pulses for all data units I1, Q1, I2 and Q2 are counted in Error Counters 252 for R symbol periods $T_s$, where R is a few thousand. The period $RT_s$ is defined as the BER gating period, and is generated by counter 254, as shown in FIG. 9. At the end of BER gating period, the error counts for each diversity signal are summed in accumulators 256, i.e. total errors for diversity signal one ($TE_1$) are given by errors on I, plus errors on $Q_1$, while total errors for diversity signal two ($TE_2$) are given by errors on $I_2$ plus error on $Q_2$. The total error count for each diversity signal is sent to comparator logic 258 which generates a two three or more bit numbers representing an approximate BER for each diversity signal 3-bit codes for the approximate BERs are shown in FIG. 9.

The performance of the diversity signal selection process described in this patent was studied using real digitally recorded 9 QPR radio signals and computer-emulated selector hardware. The diversity signals originated in a common transmitter, and were equally split and attenuated before being received by two similar receivers. This arrangement produced two diversity signals with highly correlated noise characteristics as in ineffective antenna diversities where the diversity gain $G_A=1$. Curves 1 and 2 in FIG. 10 show the measured BER characteristics of the two received diversity signals. Curve 3 shows the BER characteristics of the simulated selector's output, when the two diversity signals represented by BER curves 1 and 2 were used as the selector input. Curve 3 drops at Eb/No≧8 dB due to a finite sample space, i.e., measurement ensemble was limited to about 40,000 symbols. If the sample space was significantly increased, Curve 3 would converge with Curve 7 which shows the theoretically predicted BER characteristic of the selector. Although the simulated output BER characteristic is a few times worse than the theoretical characteristic, which is due to highly correlated noise on the two input signals, the selector output BER is many tens of times better than the BER of the two input signals even when they both have a BER worse than $10^{-2}$. Curves 4, 5, and 6 show that the diversity selection process using actual diversity signals, e.g. polarization ($G_A=10$), space or frequency ($G_A=100$), or cross-pol dual transmit dual receive ($G_A=1000$), promises output BER=$10^{-4}$ or better even if one input signal has a BER=$1-5\times10^{-2}$. Comparing Curves 4–6 to Curve 7, it can be concluded that the actual BER performance of the innovative diversity selector using any antenna diversity will always be better than the theoretically expected selector performance where the noise of the input signals is correlated.

Since the data selector 200 in accordance with the present invention reduces the diversity radio output BER to $10^{-4}$ or better even when poor performance radios are used, it allows optional FEC signal processing 194 shown if FIG. 5, to provide almost error free data transmission. At such output BER, outer forward error correction block coding alone is believed to be capable of correcting the errors which the data selector 200 fails to avoid. FIG. 11 helps to illustrate this case. It shows BER characteristics of QPSK radios using uncoded and coded single signal and of diversity signals which utilize the data selector 200 in accordance with the described invention. Curves 1 and 4 show the BER characteristics of an uncoded and FEC coded (according to ITU specifications) QPSK radio signal. Curves 2 and 3 show BER characteristics of two and three equally noisy and correlated signals, i.e. $G_A=1$, which are not coded and are selected by an ideal selector 200 in accordance with the present invention. According to the conclusion drawn from curves of FIG. 10, curve 3 represents the worst case BER performance of the current QPSK radios using ineffective antenna diversities. Curve 5 shows how the worst case scenario of curve 3 improves when FEC coding according to ITU specifications is used. This curve suggests that ITU coded QPSK modulated signals can transmit data with BER=$10^{-9}$ or better if diversity antenna arrangements are used such that the diversity signals never experience Eb/No=2 dB or worse simultaneously, or, if one diversity signal experiences Eb/No=1.5 dB or worse, while the other signal has Eb/No=9 dB or better.

While the invention has been described in terms of its preferred embodiments, it should be understood that numerous modifications may be made thereto without departing from the spirit and scope of the invention. Especially, it should be understood that the central element of the invention is the use of instantaneous baseband signal deviation (SD) from average values at the symbol decision instants, for identification of the diversity signal which has the highest probability of containing correct data unit or units in the event that at least one corresponding data unit in at least one other diversity signal differs, and the selection of radio diversity signals on the data unit basis. The method for identifying the diversity signal which has the highest probability of containing correct data unit or units in the event that at least one corresponding data unit in at least one other diversity signal differs, can be extended to a variety of methods which achieve similar objective by choosing different Analog-to-Digital converters, i, f( ), W(k), and different methods and precision for deriving SD(k) values. An example of actual system emulation which produced excellent results on a QPRS system was mentioned in the above patent description. The parameters chosen were 6 bit A/D, i=1, W(k)=1, SD(k) was a four bit number representing absolute baseband deviation from the mean value at the symbol decision instant, and f(SD)≈$SD^2$. Generally, different variations will optimize the selection process for different digital radio systems. It is intended that all such modifications fall within the scope of the appended claims.

The invention claimed is:

1. A diversity reception process comprising:

receiving at least two diversity radio signals each being composed of at least one component, and each component containing a sequence of data units which are subject to intermittent errors from one to E data units in duration wherein E is the largest number of consecutive errors that can occur on a given digital radio design;

demodulating the received diversity signals into streams of corresponding data units and their baseband signal deviation (SD) levels;

comparing corresponding data units to identify at least one data unit in the at least two diversity radio signals which differ;

when no difference in at least one corresponding data unit is identified outputting one of the at least two sequences of corresponding data units; and when at least one difference in at least one data unit of corresponding data units is identified processing the baseband signal deviation (SD) levels of all data units within the at least one difference of the sequence of corresponding data units to output each data unit within each difference having the highest probability of not containing an error.

2. A diversity radio reception process in accordance with claim 1 wherein:

prior to transmission, adding error correction data to the transmitted data such that after the reception of at least two diversity signals and the selection of the most likely correct data units, error correction data is used to further reduce errors in the resulting output data.

3. A diversity radio reception process in accordance with claim 1 wherein:

a data unit is the smallest unit of information resulting from conventional demodulation of digitally modulated signals and comprises one or more bits depending on the modulation scheme used;

a few bit baseband signal deviation (SD) level, which is proportional to the difference between the theoretically expected and actual voltage level of a digitally modulated signal for that particular data unit, is added to each demodulated data unit;

and the processing of each difference comprises:

processing the baseband signal deviation (SD) level of each data unit within each difference of the at least two diversity radio signals and the baseband signal deviation (SD) level of at least one data unit immediately before and after each difference to determine for each difference the diversity signal component which has the highest probability of containing correct data unit(s) within that difference.

4. A diversity radio reception process in accordance with claim 3 wherein:

processing of baseband signal deviation (SD) levels includes computing a weighted distortion parameter which is the product of a function of the baseband signal deviation (SD) level and the weight of a given data unit;

for each difference of each of the at least two diversity radio signals summing the weighted distortion parameters for each of the differing data units and the at least one data unit immediately before and after each difference to produce a total;

comparing the total of each of the at least two diversity radio signals; and based on the comparison of the total, choosing which diversity signal's data unit(s) are outputted when a difference in at least one data unit of at least two corresponding diversity signal components occurs.

5. A diversity radio reception process in accordance with claim 4 wherein:

the function of the baseband signal deviation (SD) level comprises a function which approximates the squaring of the baseband signal deviation (SD) level by means of a power-of-two multiplier;

the weight of a given data unit is an integer or non-integer value which is used to place emphasis on distortion parameters corresponding to data units near the beginning and end of each difference;

the smallest total identifies which diversity signal's data unit(s) are outputted when a difference in at least one data unit of at least two corresponding diversity signal components occurs.

6. A diversity radio reception process in accordance with claim 5 wherein:

the squaring function is augmented to a more complex function based on error burst characteristics in order to optimize the identification of a correct diversity signal for specific digital radio systems.

7. A diversity radio reception process in accordance with claim 2 wherein:

a data unit is the smallest unit of information resulting from conventional demodulation of digitally modulated signals and comprises one or more bits depending on the modulation scheme used;

a few bit baseband signal deviation (SD) level, which is proportional to the difference between the theoretically expected and actual voltage level of a digitally modulated signal for that particular data unit, is added to each demodulated data unit;

and the processing of each difference comprises:

processing the baseband signal deviation (SD) level of each data unit within each difference of the at least two diversity radio signals and the baseband signal deviation (SD) level of at least one data unit immediately before and after each difference to determine for each difference the diversity signal component which has the highest probability of containing correct data unit(s) within that difference.

8. A diversity radio reception process in accordance with claim 7 wherein:

processing of baseband signal deviation (SD) levels includes computing a weighted distortion parameter which is the product of a function of the baseband signal deviation (SD) level and the weight of a given data unit;

for each difference of each of the at least two diversity radio signals summing the weighted distortion parameters for each of the differing data units and the at least one data unit immediately before and after each difference to produce a total;

comparing the total of each of the at least two diversity radio signals; and based on the comparison of the total, choosing which diversity signal's data unit(s) are outputted when a difference in at least one data unit of at least two corresponding diversity signal components occurs.

9. A diversity radio reception process in accordance with claim 8 wherein:

the function of the baseband signal deviation (SD) level comprises a function which approximates the squaring of the baseband signal deviation (SD) level by means of a power-of-two multiplier;

the weight of a given data unit is an integer or non-integer value which is used to place emphasis on distortion parameters corresponding to data units near the beginning and end of each difference;

the smallest total identifies which diversity signal's data unit(s) are outputted when a difference in at least one data unit of at least two corresponding diversity signal components occurs.

10. A diversity radio reception process in accordance with claim 1 wherein:

the at least two received diversity radio signals are aligned within a fraction of a time duration of an individual data unit (symbol period $T_S$);

after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;

identifying the corresponding data units of the at least two diversity signals and aligning them as well as their respective baseband signal deviation (SD) levels with the data units of the reference signal;

determining a bit error rate of the at least two diversity signals;

comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

11. A diversity radio reception process in accordance with claim 10 wherein:

in order to provide enough time for the processing of the longest possible error burst, delaying all data units by (E+P) symbol periods $T_S$, where P is an integer which represents a processing delay.

12. A diversity radio reception process in accordance with claim 2 wherein:

the at least two received diversity radio signals are aligned within a fraction of a time duration of an individual data unit (symbol period $T_S$);

after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;

identifying the corresponding data units of the at least two diversity signals and aligning them as well as their respective baseband signal deviation (SD) levels with the data units of the reference signal;

determining a bit error rate of the at least two diversity signals;

comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

13. A diversity radio reception process in accordance with claim 12 wherein:
in order to provide enough time for the processing of the longest possible error burst, delaying all data units by (E+P) symbol periods $T_S$, where P is an integer which represents a processing delay.

14. A diversity radio reception process in accordance with claim 3 wherein:
the at least two received diversity radio signals are aligned within a fraction of a time duration of an individual data unit (symbol period $T_S$);
after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;
identifying the corresponding data units of the at least two diversity signals and aligning them as well as their respective baseband signal deviation (SD) levels with the data units of the reference signal;
determining a bit error rate of the at least two diversity signals;
comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

15. A diversity radio reception process in accordance with claim 14 wherein:
in order to provide enough time for the processing of the longest possible error burst, delaying all data units by (E+P) symbol periods $T_S$, where P is an integer which represents a processing delay.

16. A diversity radio reception process in accordance with claim 4 wherein:
the at least two received diversity radio signals are aligned within a fraction of a time duration of an individual data unit (symbol period $T_S$);
after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;
identifying the corresponding data units of the at least two diversity signals and aligning them as well as their respective baseband signal deviation (SD) levels with the data units of the reference signal;
determining a bit error rate of the at least two diversity signals;
comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

17. A diversity radio reception process in accordance with claim 16 wherein:
in order to provide enough time for the processing of the longest possible error burst, delaying all data units by (E+P) symbol periods $T_S$, where P is an integer which represents a processing delay.

18. A diversity radio reception process in accordance with claim 5 wherein:
the at least two received diversity radio signals are aligned within a fraction of a time duration of an individual data unit (symbol period $T_S$);
after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;
identifying the corresponding data units of the at least two diversity signals and aligning them as well as their respective baseband signal deviation (SD) levels with the data units of the reference signal;
determining a bit error rate of the at least two diversity signals;
comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

19. A diversity radio reception process in accordance with claim 18 wherein:
in order to provide enough time for the processing of the longest possible error burst, delaying all data units by (E+P) symbol periods $T_S$, where P is an integer which represents a processing delay.

20. A diversity radio reception process in accordance with claim 7 wherein:
the at least two received diversity radio signals are aligned within a fraction of a time duration of an individual data unit (symbol period $T_S$);
after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;
identifying the corresponding data units of the at least two diversity signals and aligning them as well as their respective baseband signal deviation (SD) levels with the data units of the reference signal;
determining a bit error rate of the at least two diversity signals;
comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

21. A diversity radio reception process in accordance with claim 20 wherein:
in order to provide enough time for the processing of the longest possible error burst, delaying all data units by (E+P) symbol periods $T_S$, where P is an integer which represents a processing delay.

22. A diversity radio reception process in accordance with claim 8 wherein:
the at least two received diversity radio signals are aligned within a fraction of a time duration of an individual data unit (symbol period $T_S$);
after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;
identifying the corresponding data units of the at least two diversity signals and aligning them as well as their respective baseband signal deviation (SD) levels with the data units of the reference signal;
determining a bit error rate of the at least two diversity signals;
comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

23. A diversity radio reception process in accordance with claim 22 wherein:
in order to provide enough time for the processing of the longest possible error burst, delaying all data units by (E+P) symbol periods $T_S$, where P is an integer which represents a processing delay.

24. A diversity radio reception process in accordance with claim 9 wherein:
the at least two received diversity radio signals are aligned within a fraction of a time duration of an individual data unit (symbol period $T_S$);
after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;
identifying the corresponding data units of the at least two diversity signals and aligning them as well as their respective baseband signal deviation (SD) levels with the data units of the reference signal;
determining a bit error rate of the at least two diversity signals;
comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

25. A diversity radio reception process in accordance with claim 24 wherein:
in order to provide enough time for the processing of the longest possible error burst, delaying all data units by (E+P) symbol periods $T_S$, where P is an integer which represents a processing delay.

26. A diversity reception system comprising:
at least two radio receivers with each receiver receiving one of at least two diversity radio signals each being composed of at least one component, and each component containing a sequence of data units which are subject to intermittent errors from one to E data units in duration wherein E is the largest number of consecutive errors that can occur on a given digital radio design;
a data selector, coupled to the at least two radio receivers, wherein the data selector demodulates the received diversity signals into streams of corresponding data units and their baseband signal deviation (SD) levels, compares corresponding data units to identify at least one data unit in the at least two diversity radio signals which differ, when no difference in at least one corresponding data unit is identified outputs one of the at least two sequences of corresponding data units and, when at least one difference in at least one data unit of corresponding data units is identified, processes the baseband signal deviation (SD) levels of all data units within the at least one difference of the sequence of corresponding data units and outputs each data unit within each difference having the highest probability of not containing an error.

27. A diversity radio reception system comprising:
a diversity radio reception system in accordance with claim 26; and
Forward Error Correction (FEC) decoder, coupled to the data selector, wherein the decoder uses error correction data inserted prior to transmission in order to further reduce errors remaining in the data selector output data.

28. A diversity radio reception system in accordance with claim 26 wherein:
a data unit is the smallest unit of information resulting from conventional demodulation of digitally modulated signals and comprises one or more bits depending on the modulation scheme used;
a few bit baseband signal deviation (SD) level, which is proportional to the difference between the theoretically expected and actual voltage level of a digitally modulated signal for that particular data unit, is added to each demodulated data unit;
and the processing of each difference by the data selector comprises:
processing the baseband signal deviation (SD) level of each data unit within each difference of the at least two diversity radio signals and the baseband signal deviation (SD) level of at least one data unit immediately before and after each difference to determine for each difference the diversity signal component which has the highest probability of containing correct data unit(s) within that difference.

29. A diversity radio reception system in accordance with claim 28 wherein processing of baseband signal deviation (SD) levels by the data selector includes:
computing a weighted distortion parameter which is the product of a function of the baseband signal deviation (SD) level and the weight of a given data unit;
for each difference of each of the at least two diversity radio signals summing the weighted distortion parameters for each of the differing data units and the at least one data unit immediately before and after each difference to produce a total;

comparing the total of each of the at least two diversity radio signals; and based on the comparison of the total, the data selector then chooses which diversity signal's data unit(s) are outputted when a difference in at least one data unit of at least two corresponding diversity signal components occurs.

30. A diversity radio reception system in accordance with claim 29 wherein:

the function of the baseband signal deviation (SD) level comprises a function which approximates the squaring of the baseband signal deviation (SD) level by means of a power-of-two multiplier;

the weight of a given data unit is an integer or non-integer value which is used to place emphasis on distortion parameters corresponding to data units near the beginning and end of each difference;

the smallest total identifies which diversity signal's data unit(s) are outputted by the data selector when a difference in at least one data unit of at least two corresponding diversity signal components occurs.

31. A diversity radio reception system in accordance with claim 30 wherein:

the squaring function is augmented to a more complex function based on error burst characteristics in order to optimize the identification of a correct diversity signal for specific digital radio systems.

32. A diversity radio reception system in accordance with claim 27 wherein:

a data unit is the smallest unit of information resulting from conventional demodulation of digitally modulated signals and comprises one or more bits depending on the modulation scheme used;

a few bit baseband signal deviation (SD) level, which is proportional to the difference between the theoretically expected and actual voltage level of a digitally modulated signal for that particular data unit, is added to each demodulated data unit;

and the processing of each difference by the data selector comprises:

processing the baseband signal deviation (SD) level of each data unit within each difference of the at least two diversity radio signals and the baseband signal deviation (SD) level of at least one data unit immediately before and after each difference to determine for each difference the diversity signal component which has the highest probability of containing correct data unit(s) within that difference.

33. A diversity radio reception system in accordance with claim 32 wherein processing of baseband signal deviation (SD) levels by the data selector includes:

computing a weighted distortion parameter which is the product of a function of the baseband signal deviation (SD) level and the weight of a given data unit;

for each difference of each of the at least two diversity radio signals summing the weighted distortion parameters for each of the differing data units and the at least one data unit immediately before and after each difference to produce a total;

comparing the total of each of the at least two diversity radio signals; and based on the comparison of the total, the data selector then chooses which diversity signal's data unit(s) are outputted when a difference in at least one data unit of at least two corresponding diversity signal components occurs.

34. A diversity radio reception system in accordance with claim 33 wherein:

the function of the baseband signal deviation (SD) level comprises a function which approximates the squaring of the baseband signal deviation (SD) level by means of a power-of-two multiplier;

the weight of a given data unit is an integer or non-integer value which is used to place emphasis on distortion parameters corresponding to data units near the beginning and end of each difference;

the smallest total identifies which diversity signal's data unit(s) are outputted by the data selector when a difference in at least one data unit of at least two corresponding diversity signal components occurs.

35. A diversity radio reception system in accordance with claim 26 wherein:

the at least two diversity receivers align their signals within a fraction of a time duration of an individual data unit (symbol period $T_S$); and the processing performed by the data selector includes:

after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;

identifying the corresponding data units of the at least two diversity signals and aligning them as well as their respective baseband signal deviation (SD) levels with the data units of the reference signal;

determining a bit error rate of the at least two diversity signals;

comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

36. A diversity radio reception system in accordance with claim 35 wherein:

in order to provide enough time for the processing of the longest possible error burst, the data selector delays all data units by (E+P) symbol periods $T_S$, where P is an integer which represents a processing delay.

37. A diversity radio reception system in accordance with claim 27 wherein:

the at least two diversity receivers align their signals within a fraction of a time duration of an individual data unit (symbol period $T_S$); and the processing performed by the data selector includes:

after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;

identifying the corresponding data units of the at least two diversity signals and aligning them as well as their respective baseband signal deviation (SD) levels with the data units of the reference signal;

determining a bit error rate of the at least two diversity signals;

comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

38. A diversity radio reception system in accordance with claim 37 wherein:
in order to provide enough time for the processing of the longest possible error burst, the data selector delays all data units by (E+P) symbol periods $T_S$, where P is an integer which represents a processing delay.

39. A diversity radio reception system in accordance with claim 28 wherein:
the at least two diversity receivers align their signals within a fraction of a time duration of an individual data unit (symbol period $T_S$); and
the processing performed by the data selector includes:
after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;
identifying the corresponding data units of the at least two diversity signals and aligning them as well as their respective baseband signal deviation (SD) levels with the data units of the reference signal;
determining a bit error rate of the at least two diversity signals;
comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

40. A diversity radio reception system in accordance with claim 39 wherein:
in order to provide enough time for the processing of the longest possible error burst, the data selector delays all data units by (E+P) symbol periods $T_S$, where P is an integer which represents a processing delay.

41. A diversity radio reception system in accordance with claim 29 wherein:
the at least two diversity receivers align their signals within a fraction of a time duration of an individual data unit (symbol period $T_S$); and
the processing performed by the data selector includes:
after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;
identifying the corresponding data units of the at least two diversity signals and aligning them as well as their respective baseband signal deviation (SD) levels with the data units of the reference signal;
determining a bit error rate of the at least two diversity signals;

comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

42. A diversity radio reception system in accordance with claim 41 wherein:
in order to provide enough time for the processing of the longest possible error burst, the data selector delays all data units by (E+P) symbol periods $T_S$, where P is an integer which represents a processing delay.

43. A diversity radio reception system in accordance with claim 30 wherein:
the at least two diversity receivers align their signals within a fraction of a time duration of an individual data unit (symbol period $T_S$); and
the processing performed by the data selector includes:
after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;
identifying the corresponding data units of the at least two diversity signals and aligning them as well as their respective baseband signal deviation (SD) levels with the data units of the reference signal;
determining a bit error rate of the at least two diversity signals;
comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

44. A diversity radio reception system in accordance with claim 43 wherein:
in order to provide enough time for the processing of the longest possible error burst, the data selector delays all data units by (E+P) symbol periods $T_S$, where P is an integer which represents a processing delay.

45. A diversity radio reception system in accordance with claim 32 wherein:
the at least two diversity receivers align their signals within a fraction of a time duration of an individual data unit (symbol period $T_S$); and
the processing performed by the data selector includes:
after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;
identifying the corresponding data units of the at least two diversity signals and aligning them as well as their respective baseband signal deviation (SD) levels with the data units of the reference signal;
determining a bit error rate of the at least two diversity signals;

comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

46. A diversity radio reception system in accordance with claim 45 wherein:

in order to provide enough time for the processing of the longest possible error burst, the data selector delays all data units by (E+P) symbol periods $T_S$, where P is an integer which represents a processing delay.

47. A diversity radio reception system in accordance with claim 33 wherein:

the at least two diversity receivers align their signals within a fraction of a time duration of an individual data unit (symbol period $T_S$); and the processing performed by the data selector includes:

after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;

identifying the corresponding data units of the at least two diversity signals and aligning them as well as their respective baseband signal deviation (SD) levels with the data units of the reference signal;

determining a bit error rate of the at least two diversity signals;

comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

48. A diversity radio reception system in accordance with claim 47 wherein:

in order to provide enough time for the processing of the longest possible error burst, the data selector delays all data units by (E+P) symbol periods $T_S$, where P is an integer which represents a processing delay.

49. A diversity radio reception system in accordance with claim 34 wherein:

the at least two diversity receivers align their signals within a fraction of a time duration of an individual data unit (symbol period $T_S$); and the processing performed by the data selector includes:

after the reception of the at least two diversity radio signals declaring one diversity radio signal a reference signal for resolving the relative carrier phase difference between diversity receivers, deriving a clock signal from the reference signal and using the clock signal as a time reference during the baseband processing of the at least two diversity radio signals;

identifying the corresponding data units of the at least two diversity signals and aligning them as well as their respective baseband signal deviation (SD) levels with the data units of the reference signal;

determining a bit error rate of the at least two diversity signals;

comparing the bit error rate of the reference signal to a first maximum allowable bit error rate and when it is greater than the first maximum allowable bit error rate using one of the other diversity radio signals as a new reference signal as long as its bit error rate is not greater than a second maximum allowable bit error rate which is smaller than the first maximum allowable bit error rate.

50. A diversity radio reception system in accordance with claim 49 wherein:

in order to provide enough time for the processing of the longest possible error burst, the data selector delays all data units by (E+P) symbol periods $T_S$, where P is an integer which represents a processing delay.

* * * * *